United States Patent
Miyazono et al.

(10) Patent No.: US 8,530,824 B2
(45) Date of Patent: Sep. 10, 2013

(54) SCANNING MICROSCOPE

(75) Inventors: Yuya Miyazono, Tokyo (JP); Daisuke Nishiwaki, Tokyo (JP); Shinichi Hayashi, Tokyo (JP)

(73) Assignee: Olympus Corporation, Tokyo (JP)

( * ) Notice: Subject to any disclaimer, the term of this patent is extended or adjusted under 35 U.S.C. 154(b) by 149 days.

(21) Appl. No.: 13/153,559

(22) Filed: Jun. 6, 2011

(65) Prior Publication Data
US 2012/0032069 A1 Feb. 9, 2012

(30) Foreign Application Priority Data
Jun. 9, 2010 (JP) ................. 2010-131772

(51) Int. Cl.
*G02B 21/00* (2006.01)
*H01J 40/14* (2006.01)

(52) U.S. Cl.
USPC ........... 250/226; 250/234; 359/368; 359/385; 356/326

(58) Field of Classification Search
USPC ................. 250/226, 234; 359/368, 370, 385, 359/389; 356/326, 327, 328, 329, 317, 332, 356/333, 334
See application file for complete search history.

(56) References Cited

U.S. PATENT DOCUMENTS

| | | | |
|---|---|---|---|
| 4,752,130 A | 6/1988 | George et al. | |
| 5,880,833 A * | 3/1999 | Iwasaki | ......................... 356/328 |
| 6,555,811 B1 | 4/2003 | Amos | |
| 6,583,873 B1 | 6/2003 | Goncharov et al. | |
| 6,614,526 B1 | 9/2003 | Engelhardt | |
| 7,167,239 B2 * | 1/2007 | Yamamoto | ..................... 356/326 |
| 7,212,285 B2 * | 5/2007 | Goto et al | ..................... 356/328 |
| 7,256,890 B2 | 8/2007 | Osawa et al. | |
| 7,365,842 B2 * | 4/2008 | Kitagawa | ...................... 356/317 |
| 7,439,483 B2 * | 10/2008 | Gweon et al. | .................. 250/216 |
| 7,817,268 B2 * | 10/2010 | Bakker et al. | .................. 356/317 |
| 2002/0109079 A1 | 8/2002 | Engelhardt et al. | |
| 2003/0095329 A1 | 5/2003 | Engelhardt | |
| 2007/0121196 A1 * | 5/2007 | Tearney et al. | ............... 359/333 |
| 2007/0241266 A1 * | 10/2007 | Gweon et al. | .................. 250/225 |
| 2009/0059360 A1 | 3/2009 | Evans et al. | |
| 2010/0014081 A1 | 1/2010 | Huening et al. | |
| 2010/0097693 A1 | 4/2010 | Koga | |
| 2011/0228267 A1 * | 9/2011 | Hayashi | ........................ 356/305 |
| 2012/0032069 A1 * | 2/2012 | Miyazono et al. | ............ 250/234 |
| 2012/0154803 A1 * | 6/2012 | Miyazono | ..................... 356/328 |

FOREIGN PATENT DOCUMENTS

| | | |
|---|---|---|
| DE | 43 30 347 A1 | 3/1995 |
| DE | 10 2004 049770 A1 | 4/2006 |
| DE | 10 2006 034907 A1 | 1/2008 |
| EP | 1 126 257 A2 | 8/2001 |
| EP | 1 315 012 A1 | 5/2003 |
| GB | 2 344 014 A | 5/2000 |

(Continued)

OTHER PUBLICATIONS

Extended European Search Report (EESR) dated Sep. 15, 2011 (in English) in counterpart European Application No. 11004598.6.

*Primary Examiner* — John Lee

(74) *Attorney, Agent, or Firm* — Holtz, Holtz, Goodman & Chick, PC

(57) ABSTRACT

A scanning microscope is provided with a scan unit that scans a sample, the scanning microscope including: a transmissive VPH grating for dispersing light from the sample; and a photodetector for detecting the light diffracted by the VPH grating.

13 Claims, 16 Drawing Sheets

(56) References Cited

FOREIGN PATENT DOCUMENTS

| | | |
|---|---|---|
| JP | 2006-10944 A | 1/2006 |
| JP | 2006-153587 A | 6/2006 |
| JP | 2006-178223 A | 7/2006 |
| WO | WO 95/07447 A1 | 3/1995 |
| WO | WO 99/39231 A1 | 8/1999 |
| WO | WO 03/046636 A1 | 6/2003 |
| WO | WO 2006/068021 A1 | 6/2006 |
| WO | WO 2008/012056 A1 | 1/2008 |
| WO | WO 2009/029843 A1 | 3/2009 |

* cited by examiner

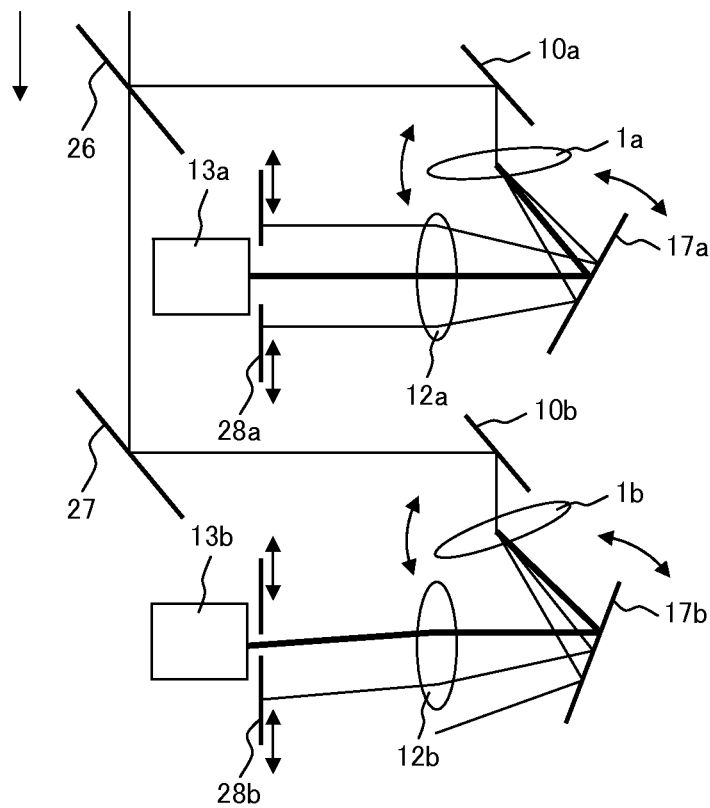
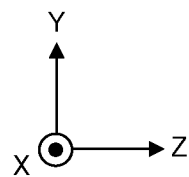
F I G. 1 1

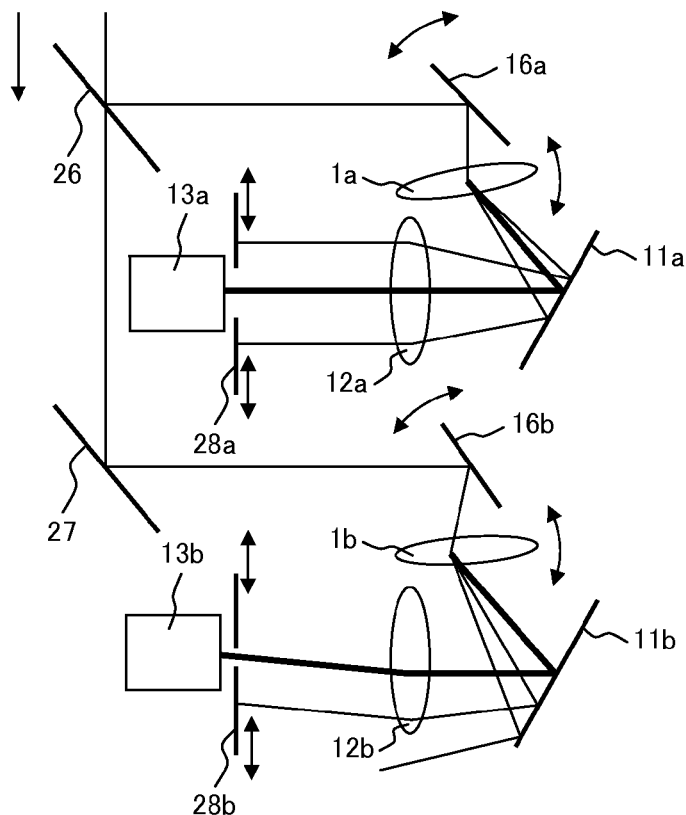
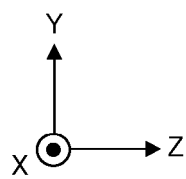
FIG. 12

SCANNING MICROSCOPE

CROSS REFERENCE TO RELATED APPLICATIONS

This application is based upon and claims the benefit of priority from the prior Japanese Patent Application No. 2010-131772, filed Jun. 9, 2010, the entire contents of which are incorporated herein by this reference.

BACKGROUND OF THE INVENTION

1. Field of the Invention

The present invention relates to a scanning microscope and particularly relates to a scanning microscope that has a spectroscopic detection function.

2. Description of the Related Art

In recent years, confocal scanning microscopes provided with a spectroscopic detection function have been developed and used. Such a microscope is disclosed in, for example, Japanese Laid-open Patent Publication No. 2006-010944.

Many confocal scanning microscopes provided with a spectroscopic detection function are used for fluorescence observations; however, as a general rule, fluorescence is weak so that the light quantity of the fluorescence obtained per unit time is small. Since a sample observed under a confocal scanning microscope is scanned at a high speed, only a short period of time is spent on exciting each point on the sample. Therefore, in order to obtain a bright image, it is necessary to efficiently lead a limited amount of generated fluorescence to a photodetector.

As disclosed in Japanese Laid-open Patent Publication No. 2006-010944, however, since currently used confocal scanning microscopes provided with a spectroscopic detection function use a reflective diffraction grating as spectroscopic means, high diffraction efficiency cannot be achieved for a wide wavelength region. This is because a reflective diffraction grating is generally a surface-relief diffraction grating which has the relief structure on the surface so as to obtain diffracted light and the diffraction efficiency of the surface-relief diffraction grating is on the order of 70% at most.

Spectroscopic means is generally an optical element that loses a large quantity of light; accordingly, in a confocal scanning microscope provided with a spectroscopic detection function, suppressing the light loss caused at spectroscopic means is effective to improve light-use efficiency.

A technology for suppressing light loss caused at spectroscopic means is disclosed in, for example, Japanese Laid-open Patent Publication No. 2006-153587. In Japanese Laid-open Patent Publication No. 2006-153587, by focusing attention on the characteristic depending on polarization direction of a reflective diffraction grating that is spectroscopic means, a technology is disclosed in which incident light is converted into S polarized light indicating higher diffraction efficiency so as to suppress light loss caused at the spectroscopic means.

Use of the technology disclosed in Japanese Laid-open Patent Publication No. 2006-153587 can improve the light-use efficiency of a confocal scanning microscope provided with a spectroscopic detection function.

SUMMARY OF THE INVENTION

A first aspect of the present invention provides a scanning microscope provided with a scan unit that scans a sample, the scanning microscope including: a transmissive VPH grating for dispersing light from the sample; and a photodetector for detecting the light diffracted by the VPH grating.

BRIEF DESCRIPTION OF THE DRAWINGS

The present invention will be more apparent from the following detailed description when the accompanying drawings are referenced.

FIG. 11 is a schematic view illustrating the configuration of a confocal scanning microscope according to embodiment 7.

FIG. 12 is a schematic view illustrating the configuration of a confocal scanning microscope according to embodiment 8.

DESCRIPTION OF THE PREFERRED EMBODIMENTS

Embodiment 1

First, before a confocal scanning microscope according to the present embodiment are described, a VPH grating 1 included in the confocal scanning microscope will be described with reference to FIGS. 1A, 1B, 1C, and 2.

Figure 1C:
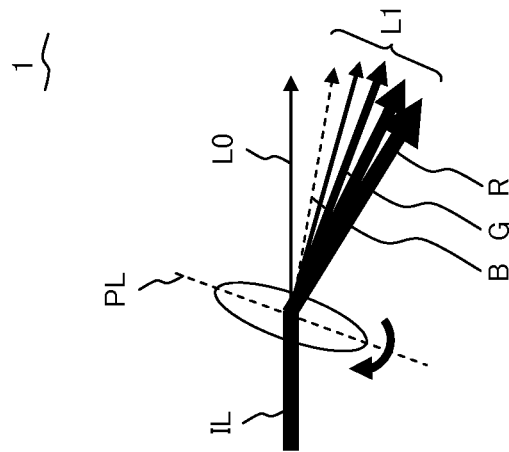
FIG. 1C is a diagram illustrating actions of the VPH grating included in the confocal scanning microscope according to embodiment 1, the VPH grating forming a tilt angle different from the ones shown in FIGS. 1A and 1B.
Figure 1B:
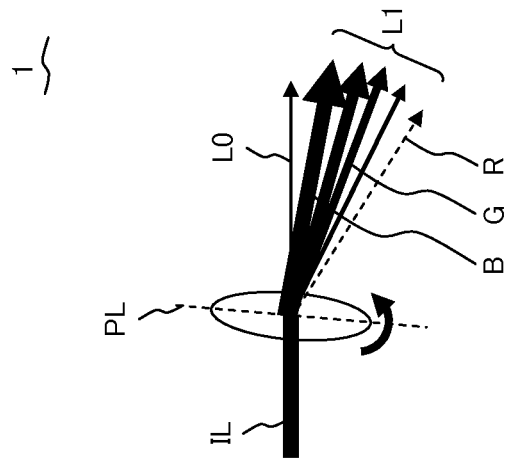
FIG. 1B is a diagram illustrating actions of the VPH grating included in the confocal scanning microscope according to embodiment 1, the VPH grating forming a tilt angle different from the one shown in FIG. 1A.
Figure 1A:
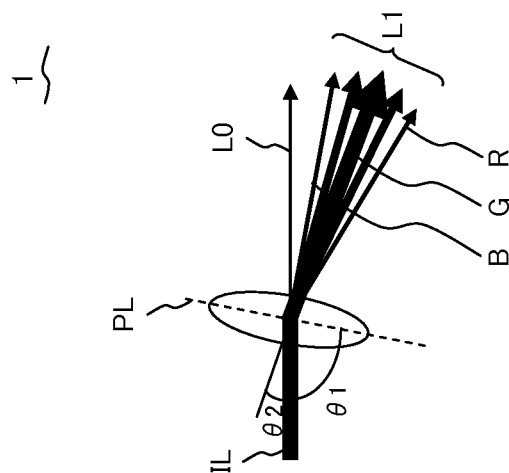
FIG. 1A is a diagram illustrating actions of a VPH grating included in a confocal scanning microscope according to embodiment 1, the VPH grating forming a certain tilt angle.
Figure 2:
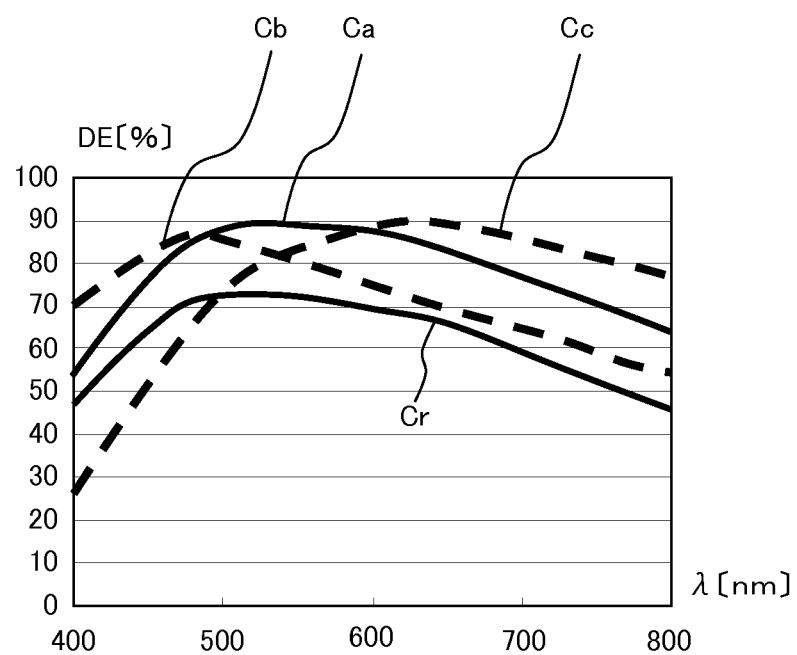
FIG. 2 is a diagram illustrating the diffraction efficiency of the VPH grating illustrated in FIG. 1.

FIGS. 1A-1C are each a diagram illustrating actions of a Volume Phase Holographic grating (hereinafter referred to as a VPH grating) included in the confocal scanning microscope according to the present embodiment. FIG. 2 is a diagram illustrating diffraction characteristics of the VPH grating illustrated in FIGS. 1A-1C. In FIG. 2, the ordinate and the abscissa indicate a diffraction efficiency (DE) (%) and a wavelength (nm), respectively. Characteristic Cr illustrated in FIG. 2 indicates a diffraction characteristic of a surface-relief diffraction grating according to a prior art. Characteristics Ca, Cb, and Cc in FIG. 2 indicate diffraction characteristics of the VPH grating 1 according to the present embodiment illustrated in FIGS. 1A, 1B and 1C, respectively.

The VPH grating 1 illustrated in FIGS. 1A-1C includes a VPH layer whose refractive index cyclically changes along a main straight-line PL. The direction parallel to the main straight-line PL along which the refractive index cyclically changes will be hereinafter referred to as a refractive-index distribution direction. The VPH grating 1 is a transmissive diffraction grating that emits 0-th order diffracted light L0 in the direction parallel to incident light IL and emits, for each wavelength, first order diffracted light L1 forming a different angle with the 0-th order diffracted light. The VPH grating 1 has a diffraction characteristic that can achieve high diffraction efficiency for a wide band in comparison with a surface-relief diffraction grating.

In general, VPH gratings have a tradeoff between the maximum diffraction efficiency and a bandwidth in which diffracted light can be obtained. Accordingly, the diffraction characteristic achieved by VPH gratings has selectivity. As illustrated in FIG. 2, the VPH grating 1 according to the present embodiment (see characteristics Ca, Cb, and Cc in FIG. 2) is a VPH grating designed so that it achieves a diffraction characteristic achieving a higher diffraction efficiency than a surface-relief diffraction grating (see characteristic Cr in FIG. 2) and achieving a bandwidth as wide as or wider than the surface-relief diffraction grating (see characteristic Cr in FIG. 2).

As with the diffraction characteristic of a general VPH grating, the diffraction characteristic of the VPH grating 1 has the following features.

First, depending on an angle θ1 formed by the refractive-index distribution direction and the optical axis of the incident light IL (hereinafter referred to as a tilt angle), the wavelength at the peak of the diffraction efficiency of the first order diffracted light L1 (hereinafter referred to as a first order diffraction efficiency) (this wavelength will be hereinafter referred to as a Bragg wavelength) changes. In other words, depending on an incident angle θ2, the Bragg wavelength changes.

As an example, in the VPH grating 1 illustrated in FIG. 1A, the first order diffraction efficiency for the wavelength G (green) is the highest (See characteristic Ca in FIG. 2. A broader arrow indicates a higher diffraction efficiency in FIG. 1A). Meanwhile, when the VPH grating 1 is rotated in the counterclockwise direction so as to increase the tilt angle θ1, then, as illustrated in FIG. 1B, the peak of the diffraction efficiency is shifted to the short wavelength side so that the first order diffraction efficiency for the wavelength B (blue) becomes the highest (see characteristic Cb in FIG. 2). When the VPH grating 1 is rotated in the clockwise direction so as to decrease the tilt angle θ1, then, as illustrated in FIG. 1C, the peak of the diffraction efficiency is shifted to the long wavelength side so that the first order diffraction efficiency for the wavelength R (red) becomes the highest (see characteristic Cc in FIG. 2).

Second, even when the tilt angle θ1 (or the incident angle θ2) changes, the angle formed by the incident light IL and the first order diffracted light remains almost the same under the condition of the same wavelength. Accordingly, the angle formed by the 0-th order diffracted light L0 and the first order diffracted light (hereinafter referred to as an exit angle) also remains almost the same under the condition of the same wavelength. In other words, if the direction of the 0-th order diffracted light L0 is fixed, the emission direction (hereinafter referred to as a diffraction direction) of the first order diffracted light is essentially fixed under the condition of the same wavelength.

Figures 3A, 3B:
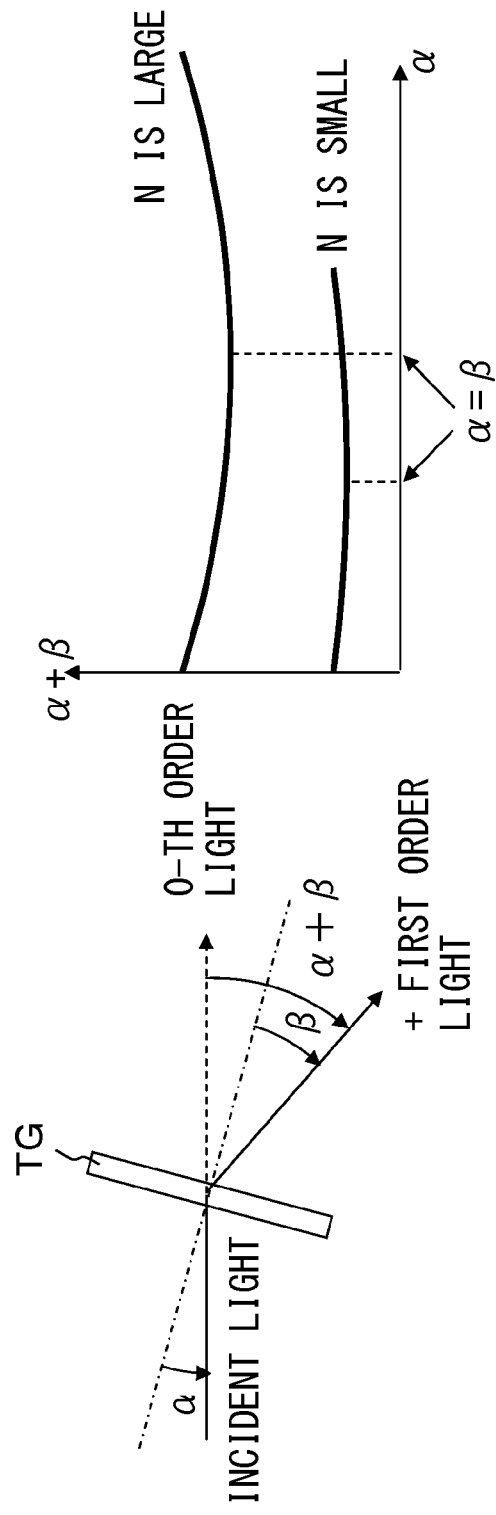
FIG. 3A is a diagram illustrating a diffraction provided by a transmissive diffraction grating including a VPH grating, wherein a state of the diffraction in the transmissive diffraction grating is shown.
FIG. 3B is a diagram illustrating a diffraction provided by the transmissive diffraction grating including the VPH grating, wherein the relationship between a diffraction angle and an exit angle provided by the transmissive diffraction grating is shown.

FIGS. 3A and 3B are each a diagram illustrating a diffraction provided by a transmissive diffraction grating including the VPH grating 1. FIG. 3A shows a diffraction in the transmissive diffraction grating. FIG. 3B illustrates a relationship between a diffraction angle and an exit angle provided by the transmissive diffraction grating. With reference to FIGS. 3A and 3B, the fact that the diffraction direction typical of the transmissive diffraction grating is essentially fixed irrespective of incident angles will be described.

As illustrated in FIG. 3A, the exit angle of the first order diffracted light relative to the 0-th light is represented as α+β. Here, α indicates an incident angle relative to a transmissive diffraction grating TG (corresponding to θ2 in FIG. 1). β indicates the diffraction angle of the first order diffracted light.

In regard to general diffraction gratings including a transmissive diffraction grating, the following formula indicates the relationship between an incident angle α and a diffraction angle β.

$$\sin \alpha + \sin \beta = N\lambda \qquad (1)$$

Here, N indicates the grating frequency of the diffraction grating. λ indicates the wavelength of light incident on the diffraction grating.

When N and λ in the formula (1) are fixed, then, in the vicinity of α=β, the exit angle α+β indicates essentially no changes. Accordingly, in the transmissive diffraction grating, even when the incident angle changes, the exit angle of the first order diffraction light relative to the 0-th order light is essentially fixed under the condition of the same wavelength, and hence the diffraction direction remains essentially fixed irrespective of incident angles. The approximation is precisely established especially when the grating frequency N is low.

The reason why the VPH grating 1 has the first feature described above is that the diffraction phenomenon caused at the VPH grating 1 is under the influence of the Bragg condition. Accordingly, the maximum diffraction efficiency of the VPH grating 1 is indicated for the first order diffracted light L1 having a wavelength such that the diffraction angle and the incident angle θ2 are identical with each other. This is because the Bragg condition is satisfied in this situation. The reason why the VPH grating 1 has the second feature described above is that the VPH grating is a transmissive diffraction grating.

Next, the confocal scanning microscope according to the present embodiment will be described.

Figure 4:
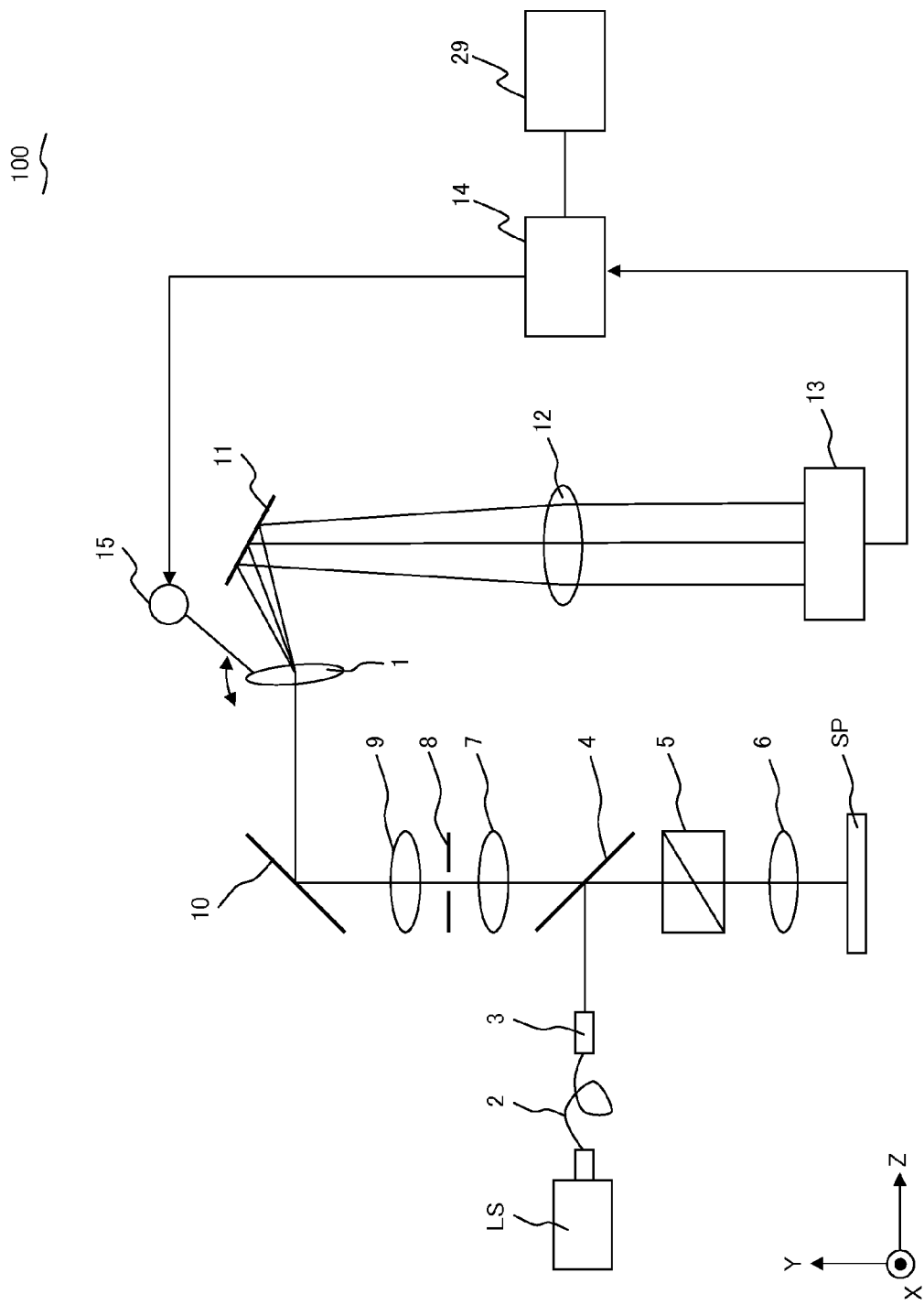
FIG. 4 is a schematic view illustrating the configuration of the confocal scanning microscope according to embodiment 1.

FIG. 4 is a schematic view illustrating the configuration of the confocal scanning microscope according to the present embodiment. An XYZ coordinate system in FIG. 4 is a left-handed orthogonal coordinate system provided for the sake of direction reference.

A confocal scanning microscope 100 illustrated in FIG. 4 is a confocal microscope provided with a scan unit for scanning a sample, and it includes the aforementioned VPH grating 1 for dispersing fluorescence from the sample and a photodetector 13 for detecting the fluorescence diffracted by the VPH grating 1. The photodetector 13 is a multichannel detector on which a plurality of light receiving elements are one-dimensionally arranged. The confocal scanning microscope 100 also includes a collective lens 12 for focusing fluorescence onto the photodetector 13, wherein the collective lens 12 is located between the VPH grating 1 and the photodetector 13.

More specifically, the confocal scanning microscope 100 includes: a laser light source LS for emitting laser light; an optical fiber 2; a collimator lens 3; a dichroic mirror 4 for reflecting laser light and allowing passage of fluorescence; a galvanometer mirror 5 which is a scan unit for scanning a sample (not shown) placed on a sample plane SP with laser light; an objective 6; a confocal lens 7; a confocal stop 8 having a pinhole at a position conjugate to the focal position of the objective 6; a collimator lens 9; a mirror 10; the VPH grating 1; a mirror 11; the collective lens (collective optical system) 12; the photodetector 13; a control unit 14 for controlling the entirety of the confocal scanning microscope 100; and a drive unit 15 for rotating the VPH grating 1 in accordance with an instruction from the control unit 14.

The collective lens 12 can be replaced with a concave mirror or the like having positive power.

The control unit 14 can cause the drive unit 15 to change the tilt angle which is an angle formed by the optical axis of fluorescence incident on the VPH grating 1 and the refractive-index distribution direction of the VPH grating 1. That is, the control unit 14 and the drive unit 15 together function as an incident-angle change unit for changing an incident angle by changing the tilt angle of the VPH grating 1, and the incident-angle change unit can rotate the VPH grating 1 around a rotation axis that is perpendicular to a plane (a YZ plane) parallel to both the optical axis and the refractive-index distribution direction.

Actions taken by the confocal scanning microscope 100 during the process from the emission of laser light to the detection of fluorescence will be described.

Laser light emitted from the laser light source LS is transmitted through the optical fiber 2 to the collimator lens 3, where it is converted into an essentially parallel light flux, and the essentially parallel light flux is incident on the dichroic mirror 4. In addition, the laser light is reflected from the dichroic mirror 4 and is incident on the objective 6 via the galvanometer mirror 5. The objective 6 focuses the laser light onto one point on a sample placed on the sample plane SP so as to irradiate it. Accordingly, a fluorescence substance within the sample is excited by the laser light.

The fluorescence from the sample follows the same light path as the one which the laser light follows but proceeds in the direction opposite to the laser light, and hence the fluorescence is incident on the dichroic mirror 4 via the objective 6 and the galvanometer mirror 5. The confocal lens 7 focuses the fluorescence having passed through the dichroic mirror 4. Since the confocal stop 8 has a pinhole at a position optically conjugate to the focal position of the objective 6, only the fluorescence generated from the focal position of the objective 6 passes through the confocal stop 8. The fluorescence is then converted at the collimator lens 9 into an essentially parallel light flux which is incident on the VPH grating 1 via the mirror 10.

In the VPH grating 1, fluorescence is diffracted so that it is emitted to form a different diffraction angle for each wavelength. First order diffracted light (fluorescence) having been emitted to form a different diffraction angle for each wavelength is reflected from the mirror 11 and is then incident on the collective lens 12 so that it forms a different angle with the optical axis for each wavelength. Accordingly, the collective lens 12 causes the first order diffracted light to be incident on a different position (light receiving element) of the photodetector 13 for each wavelength, and hence the first order diffracted light is detected by a different channel for each wavelength.

The first order diffracted light (fluorescence) detected by the photodetector 13 is converted into an electrical signal which is transmitted to the control unit 14. On the basis of the electrical signal which is obtained via the galvanometer mirror 5 scanning the sample and which relates to each point on the sample, the control unit 14 forms a fluorescence image, performs an analyzing process, and the like. The fluorescence image and the result of analysis are then displayed on a display unit 29 such as a monitor.

As illustrated in FIG. 2, for the entire wavelength region of light to be detected, the VPH grating 1 can achieve higher diffraction efficiency than a surface-relief diffraction grating. Accordingly, in comparison with conventional confocal scanning microscopes using a surface-relieve diffraction grating as a spectroscopic unit, the confocal scanning microscope 100 including the VPH grating 1 is a confocal scanning microscope that is provided with a spectroscopic detection function and that has high light-use efficiency for a wide wavelength region. Therefore, the confocal scanning microscope 100 according to the present embodiment can achieve high light-use efficiency for a wide wavelength region.

FIG. 2 shows an example in which the wavelength region of light to be detected is within the range of visible light, but this is not particularly required.

In the confocal scanning microscope 100, the incident angle of light incident on the VPH grating 1 can be changed by the control unit 14 and the drive unit 15. Via the change in incident angle, the VPH grating 1 can change any wavelength into the Bragg wavelength. Accordingly, by changing the Bragg wavelength depending on the wavelength of fluorescence to be detected, the confocal scanning microscope 100 according to the present embodiment can achieve higher light-use efficiency. When a plurality of kinds of fluorescence are simultaneously detected, the fluorescence of the kind most efficiently detected can be optionally selected. In addition, when a plurality of kinds of fluorescence are simultaneously detected, the Bragg wavelength can be set or selected such that detection efficiency is optimized for the entirety of a wavelength region of interest.

The VPH grating 1 is a transmissive diffraction grating, and hence, irrespective of incident angles, the direction of the 0-th order diffracted light is fixed. Under the condition of the same wavelength, the exit angle is also essentially fixed irrespective of incident angles. Accordingly, irrespective of incident angles, the first order diffracted light is always emitted in an essentially fixed diffraction direction under the condition of the same wavelength so that it is detected by the same light collector element. Therefore, by rotating the VPH grating 1 so as to change an incident angle, the confocal scanning microscope 100 according to the present embodiment enables the fluorescence most efficiently detected to be optionally selected without changing the wavelength region of light to be detected.

By changing the incident angle of light incident on the VPH grating 1, the Bragg wavelength of light to be most efficiently detected can be changed. Accordingly, in synchrony with the change in the Bragg wavelength which is made by rotating the VPH grating 1, only the signals of a channel corresponding to the Bragg wavelength can be sequentially obtained; therefore, spectral data of high efficiency can be obtained at a high speed for the entire wavelength region of detected light.

Embodiment 2

Figure 5:
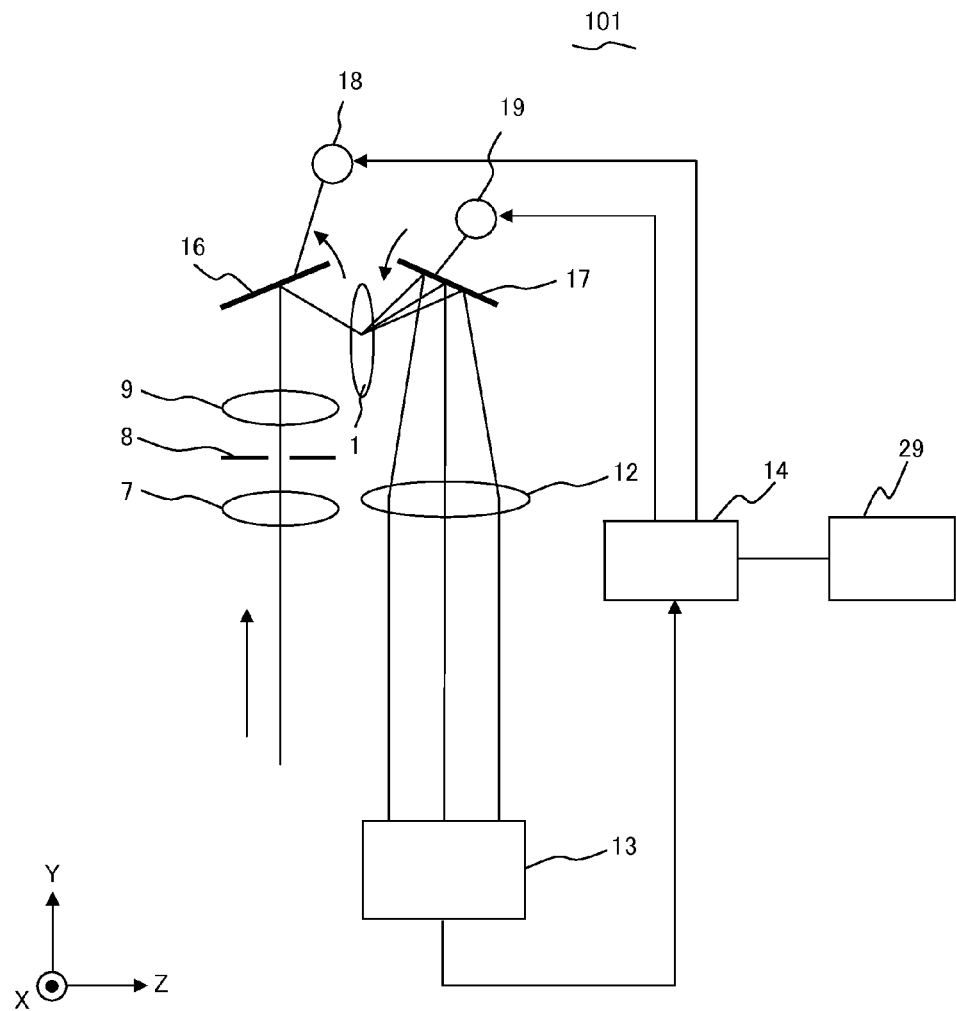
FIG. 5 is a schematic view illustrating the configuration of a confocal scanning microscope according to embodiment 2.

FIG. 5 is a schematic view illustrating the configuration of a confocal scanning microscope according to the present embodiment. An XYZ coordinate system in FIG. 5 is a left-handed orthogonal coordinate system provided for the sake of direction reference.

A confocal scanning microscope 101 according to the present embodiment illustrated in FIG. 5 is different from the confocal scanning microscope 100 according to embodiment 1 in the sense that a mirror 16 (a first mirror), which rotates around an X axis, is provided instead of the mirror 10, that a mirror 17 (a second mirror), which rotates around the X axis, is provided instead of the mirror 11, and that drive units 18 and 19 are provided instead of the drive unit 15. In regard to the points other than these differences, the configuration of the confocal scanning microscope 101 according to the present embodiment is similar to that of the confocal scanning microscope 100 illustrated in FIG. 4. Accordingly, only portions of the configuration of the confocal scanning microscope 101 are shown in FIG. 5.

The mirror 16 is located between the galvanometer mirror 5 (not shown) and the VPH grating 1, and it is connected to the drive unit 18 which rotates the mirror 16 around a rotation axis (the X axis) perpendicular to an YZ plane. In addition, the drive unit 18 is connected to the control unit 14. That is, the drive unit 18 and the control unit 14 together function as an incident-angle change unit for changing an incident angle by rotating the mirror 16 around the rotation axis perpendicular to the YZ plane (X axis).

The incident-angle change unit of the confocal scanning microscope 101 rotates the mirror 16 instead of the VPH grating 1 in order to change the incident angle. Accordingly, the direction of 0-th order diffracted light also changes depending on the incident angle. Therefore, the diffraction direction of first order diffracted light depends on the incident angle.

The mirror 17 is located between the VPH grating 1 and the collective lens 12, and it is connected to the drive unit 19 which rotates the mirror 17 around a rotation axis perpendicular to the YZ plane (X axis). In addition, the drive unit 19 is connected to the control unit 14.

As an example, the drive unit 19 and the control unit 14 rotate the mirror 17 so that first order diffracted light emitted in a diffraction direction that changes depending on the incident angle is always reflected in a fixed direction for each wavelength. Accordingly, the first order diffracted light is always focused by the collective lens 12 onto a fixed position for each wavelength, and hence the wavelength region of light to be incident on the light receiving elements of the photodetector 13 is maintained irrespective of incident angles. That is, the drive unit 19 and the control unit 14 together function as a detection-wavelength region maintenance unit which maintains the wavelength region of fluorescence to be detected by the photodetector 13.

Since the wavelength region of light to be detected also changes via the rotation of the mirror 16, the control unit 14 and the drive unit 19 may function as the detection-wavelength region maintenance unit together with the drive unit 18.

Figure 6C:
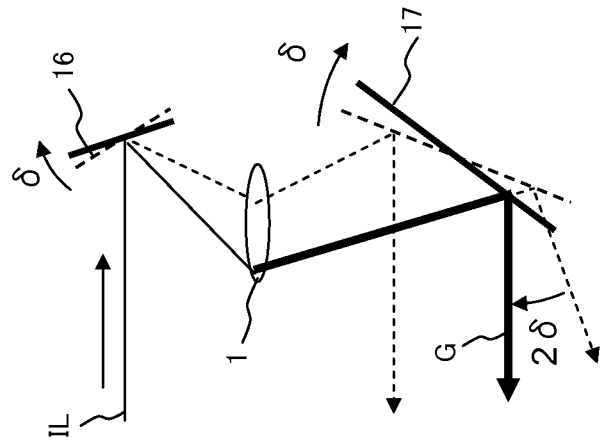
FIG. 6C is a diagram illustrating operations of the mirrors included in the confocal scanning microscope illustrated in FIG. 5, wherein a situation is shown in which both the mirror located on the incident side of the VPH grating and the mirror located on the emission side are operated.
Figure 6B:
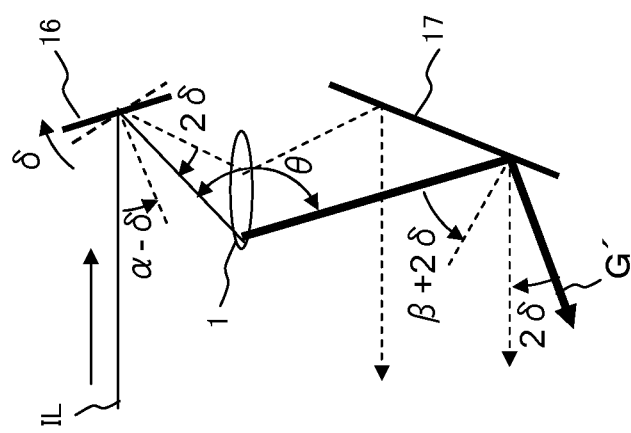
FIG. 6B is a diagram illustrating operations of the mirrors included in the confocal scanning microscope illustrated in FIG. 5, wherein a situation is shown in which only the mirror located on the incident side of the VPH grating is operated.
Figure 6A:
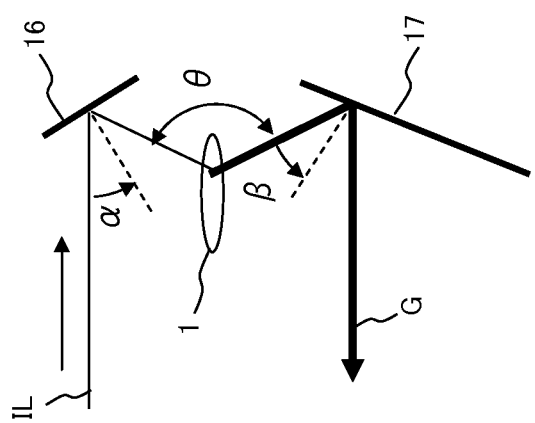
FIG. 6A is a diagram illustrating operations of mirrors included in the confocal scanning microscope illustrated in FIG. 5.

FIGS. 6A, 6B and 6C are each a diagram illustrating operations of the mirrors 16 and 17 included in the confocal scanning microscope 101. With reference to FIGS. 6A to 6C, descriptions will be given of a method for controlling the mirrors 16 and 17 to maintain the wavelength region of light to be detected irrespective of incident angles.

As illustrated in FIG. 6A, let $\alpha$ indicate the incident angle of incident light IL incident on the mirror 16, let $\beta$ indicate the incident angle of green first order diffracted light G incident on the mirror 17, and let $\theta$ indicate an angle formed by light incident on the VPH grating 1 and the green first order diffracted light G.

FIG. 6B shows an example in which, in order to change the incident angle, the incident-angle change unit rotates the mirror 16 by angle $\delta$ in the clockwise direction, thereby changing the angle $\alpha$ formed by normal to the mirror 16 and the incident light IL into an angle $\alpha$-$\delta$. At that time, the incident angle of the light reflected from the mirror 16 and incident on the VPH grating 1 increases by 2$\delta$. Since the angle of the emission of diffracted light is essentially fixed for each wavelength irrespective of incident angles, the incident angle of the green first order diffracted light G incident on the mirror 17 also increases by 2$\delta$. Therefore, 2$\delta$ will be the angle formed by the green first order diffracted light G reflected from the mirror 17 before the change of the incident angle and the green first order diffracted light G' reflected from the mirror 17 after the change of the incident angle.

As illustrated in FIG. 6C, the detection-wavelength region maintenance unit can rotate the mirror 17 by angle $\delta$ in the clockwise direction as with the mirror 16 so as to emit the green first order diffracted light G in the direction parallel to the incident angle IL. Accordingly, the first order diffracted light G is always reflected in a fixed direction irrespective of the incident angle, and hence pieces of first order diffracted light having other wavelengths are also always reflected in fixed directions for each wavelength irrespective of the incident angle. As a result, the wavelength region of fluorescence to be detected by the photodetector 13 is maintained.

Similarly, when the incident-angle change unit rotates the mirror 16 by angle $\delta$ in the counterclockwise direction in order to change the incident angle, the mirror 17 can be rotated by angle $\delta$ in the counterclockwise direction so that the first order diffracted light is always reflected in a fixed direction for each wavelength irrespective of incident angles. In other words, by rotating the mirror 16 and the mirror 17 in the same direction by the same angle, the wavelength region of fluorescence to be detected by the photodetector 13 is maintained.

FIGS. 6A to 6C each show an example in which the control unit 14 and the drive unit 19 function as a detection-wavelength region maintenance unit which maintains the wavelength region of fluorescence to be detected by the photodetector 13; however, the configuration is not particularly limited to these. The control unit 14 and the drive unit 19 do not necessarily need to be operated to maintain the wavelength region of light to be detected, and, instead, they may rotate the mirror 17 and the mirror 16 separately so as to shift the wavelength region of light to be detected. In such a case, the control unit 14 and the drive unit 19 together function as a detection-wavelength region shift unit which controls the center of the wavelength region of light to be detected without changing the bandwidth of fluorescence to be detected by the photodetector 13. The control unit 14 and the drive unit 19 may also function as a detection-wavelength region shift unit together with the drive unit 18.

According to the confocal scanning microscope 101 according to the present embodiment, because of the inclusion of the VPH grating 1, high light-use efficiency for a wide wavelength region can be achieved as with the confocal scanning microscope 100 according to embodiment 1.

Via the control unit 14 and the drive unit 18 rotating the mirror 16, the confocal scanning microscope 101 can change the incident angle of light incident on the VPH grating 1. As a result, by changing the Bragg wavelength depending on the wavelength of fluorescence to be detected, the confocal scanning microscope 101 can achieve higher light-use efficiency as with the confocal scanning microscope 100 according to embodiment 1. When a plurality of kinds of fluorescence are simultaneously detected, the fluorescence of the kind most efficiently detected can be optionally selected.

Via the control unit 14 and the drive unit 19 rotating the mirror 17, the confocal scanning microscope 101 can maintain the wavelength region of fluorescence to be detected by the photodetector 13. Therefore, as with the confocal scanning microscope 100 according to embodiment 1, the confocal scanning microscope 101 enables the fluorescence most efficiently detected to be optionally selected without changing the wavelength region of light to be detected. In addition, the confocal scanning microscope 101 may also shift the wavelength region of light to be detected.

Embodiment 3

Figure 7A:
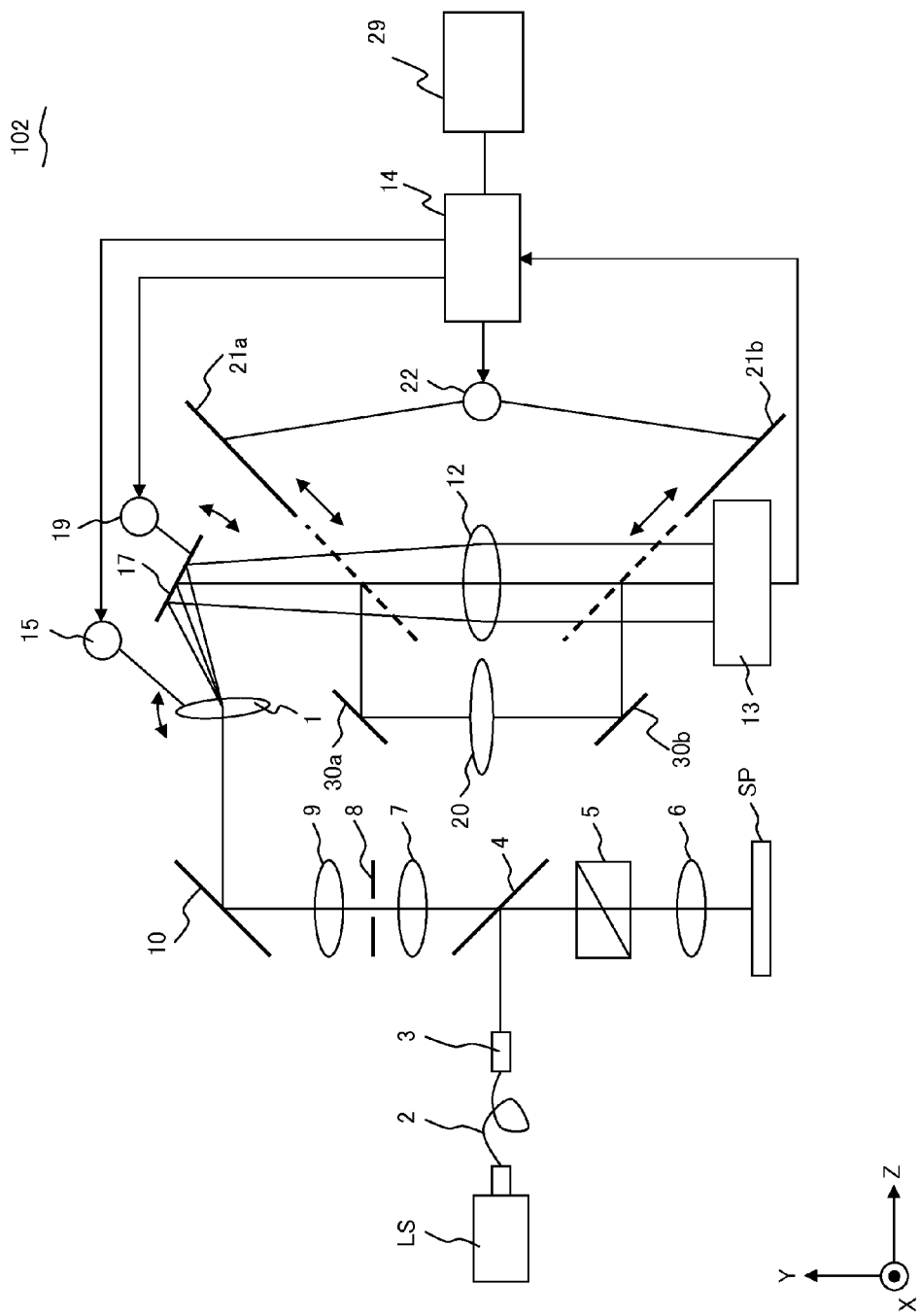
FIG. 7A is a schematic view illustrating the configuration of a confocal scanning microscope according to embodiment 3.

FIG. 7A is a schematic view illustrating the configuration of a confocal scanning microscope according to the present embodiment. An XYZ coordinate system in FIG. 7A is a left-handed orthogonal coordinate system provided for the sake of direction reference.

A confocal scanning micros cope 102 according to the present embodiment illustrated in FIG. 7A is different from the confocal scanning microscope 100 according to embodiment 1 in the sense that a mirror 17, which rotates around an X axis, is provided instead of the mirror 11 in FIG. 4 according to embodiment 1, and that a drive unit 19, a collective lens 20, a mirror 21a, a mirror 21b, and a drive unit 22 are further provided. In regard to the points other than these differences, the configuration of the confocal scanning microscope 102 according to the present embodiment is similar to that of the confocal scanning microscope 100 illustrated in FIG. 4.

As with the case in embodiment 1, the control unit 14 and the drive unit 15 together function as an incident-angle change unit for changing an incident angle by changing the tilt angle of the VPH grating 1. The incident-angle change unit can rotate the VPH grating 1 around a rotation axis that is perpendicular to a plane (a YZ plane) parallel to both the optical axis and the refractive-index distribution direction, and hence it can change the Bragg wavelength.

The mirror 17 is located between the VPH grating 1 and the collective lens 12, and it is connected to the drive unit 19 which rotates the mirror 17 around a rotation axis (the X axis) perpendicular to an YZ plane (X axis). In addition, the drive unit 19 is connected to the control unit 14.

As with the case in embodiment 2, the drive unit 19 and the control unit 14 together function as a detection-wavelength region shift unit which controls the center of the wavelength region of light to be detected. When a control is performed such that the mirror 17 is not operated, the drive unit 19 and the control unit 14 can together function as a detection-wavelength region maintenance unit which maintains the wavelength region of fluorescence to be detected by the photodetector 13.

The confocal scanning microscope 102 includes a collective lens 12 and a collective lens 20 which are located between the VPH grating 1 and the photodetector 13, which are selectively used, and each of which has a different focal length. The collective lens 20 has a greater focal length than the collective lens 12.

The control unit 14 can cause the drive unit 22 to insert and remove the mirrors 21a and 21b into and from the light path of reflection light from the mirror 17. Via the insertion or the removal of the mirrors, fluorescence is incident on an appropriate lens. Specifically, when the mirrors 21a and 21b are removed from the light path, first order diffracted light reflected from the mirror 17 is focused on the photodetector 13 by the collective lens 12. Meanwhile, when the mirrors 21a and 21b are inserted in the light path, the first order diffracted light reflected from the mirror 17 is incident on the collective lens 20 via the mirror 21a and a mirror 30a. The collective lens 20 focuses the first order diffracted light on the photodetector 13 via a mirror 30b and the mirror 21b.

In general, as the focal length becomes greater or as the grating frequency of the diffraction grating becomes higher, the wavelength-dispersion amount becomes larger. Accordingly, in the confocal scanning microscope 102, the width of the wavelength region of fluorescence incident on the photodetector 13 via the collective lens 20 is less than the width of the wavelength region of fluorescence incident on the photodetector 13 via the collective lens 12. In other words, when the wavelength-dispersion amount is small, light within a wide wavelength region; for example, light within the entirety of visible light range, is detected. When the wavelength-dispersion amount is large, light within a narrow wavelength region is detected.

Accordingly, the control unit 14 and the drive unit 22 together function as a bandwidth change unit which changes the width of the wavelength region of fluorescence detected by the photodetector 13. In inverse proportion to the width of the wavelength region of fluorescence incident on the photodetector 13, the bandwidth of fluorescence incident on each light receiving element decreases so that the resolution is improved. As a result, the control unit 14 and the drive unit 22 also together function as a wavelength resolution change unit which changes the wavelength resolution.

The condition in which the wavelength-dispersion amount is small will be hereinafter referred to as a wide band detection condition, and the condition in which the wavelength-dispersion amount is large will be hereinafter referred to as a narrow band detection condition or a high-resolution detection condition.

As described above, according to the confocal scanning microscope 102 according to the present embodiment, because of the inclusion of the VPH grating 1, high light-use efficiency for a wide wavelength region can be achieved under the wide band detection condition, as with the confocal scanning microscope 100 according to embodiment 1.

Via the control unit 14 and the drive unit 15 rotating the VPH grating 1, the confocal scanning microscope 102 can change the incident angle of light incident on the VPH grating 1. As a result, by changing the Bragg wavelength depending on the wavelength of fluorescence to be detected, the confocal scanning microscope 102 can achieve higher light-use efficiency as with the confocal scanning microscope 100 according to embodiment 1. When a plurality of kinds of fluorescence are simultaneously detected, the fluorescence of the kind most efficiently detected can be optionally selected.

Via the control unit 14 and the drive unit 22 inserting and removing the mirrors 21a and 21b into and from the path of detected light, the confocal scanning microscope 102 can change the width of the wavelength region of fluorescence to be detected. Accordingly, if necessary, the confocal scanning microscope 102 can readily switch between the detection of light within a wide wavelength region under the wide band detection condition and the detection at a high resolution under the narrow band detection condition.

In addition, via the control unit 14 and the drive unit 19 rotating the mirror 17, the confocal scanning microscope 102 can maintain the wavelength region of fluorescence to be detected by the photodetector 13. Therefore, as with the confocal scanning microscope 100 according to embodiment 1, the confocal scanning microscope 102 enables the fluorescence most efficiently detected to be optionally selected without changing the wavelength region of light to be detected. Such a control is particularly effective for the wide band detection condition.

Via the control unit 14 and the drive unit 19 rotating the mirror 17, the confocal scanning microscope 102 can control the center of the wavelength region of light to be detected. As a result of this, the wavelength region of fluorescence to be detected by the photodetector 13 can be shifted. Accordingly, the confocal scanning microscope 102 can readily change the wavelength region of light to be detected aside from changing the Bragg wavelength. Such a control is particularly effective for the narrow band detection condition.

By changing the wavelength region of light to be detected and the Bragg wavelength simultaneously depending on the wavelength of fluorescence to be detected, high light-use efficiency can be achieved through a few detection processes. The wavelength region of light to be detected can be shifted seamlessly and the Bragg wavelength can be changed in synchrony with this shift, thereby detecting light within a wide band with a high resolution at high light-use efficiency.

FIG. 7A shows an example in which the mirrors 21a and 21b are inserted into or removed from the path of detected light so that the condition is switched between the wide band detection condition and the narrow band detection condition (or the high-resolution detection condition); however, the configuration is not particularly limited to this. The detection condition may be changed using another method.

Figure 7B:
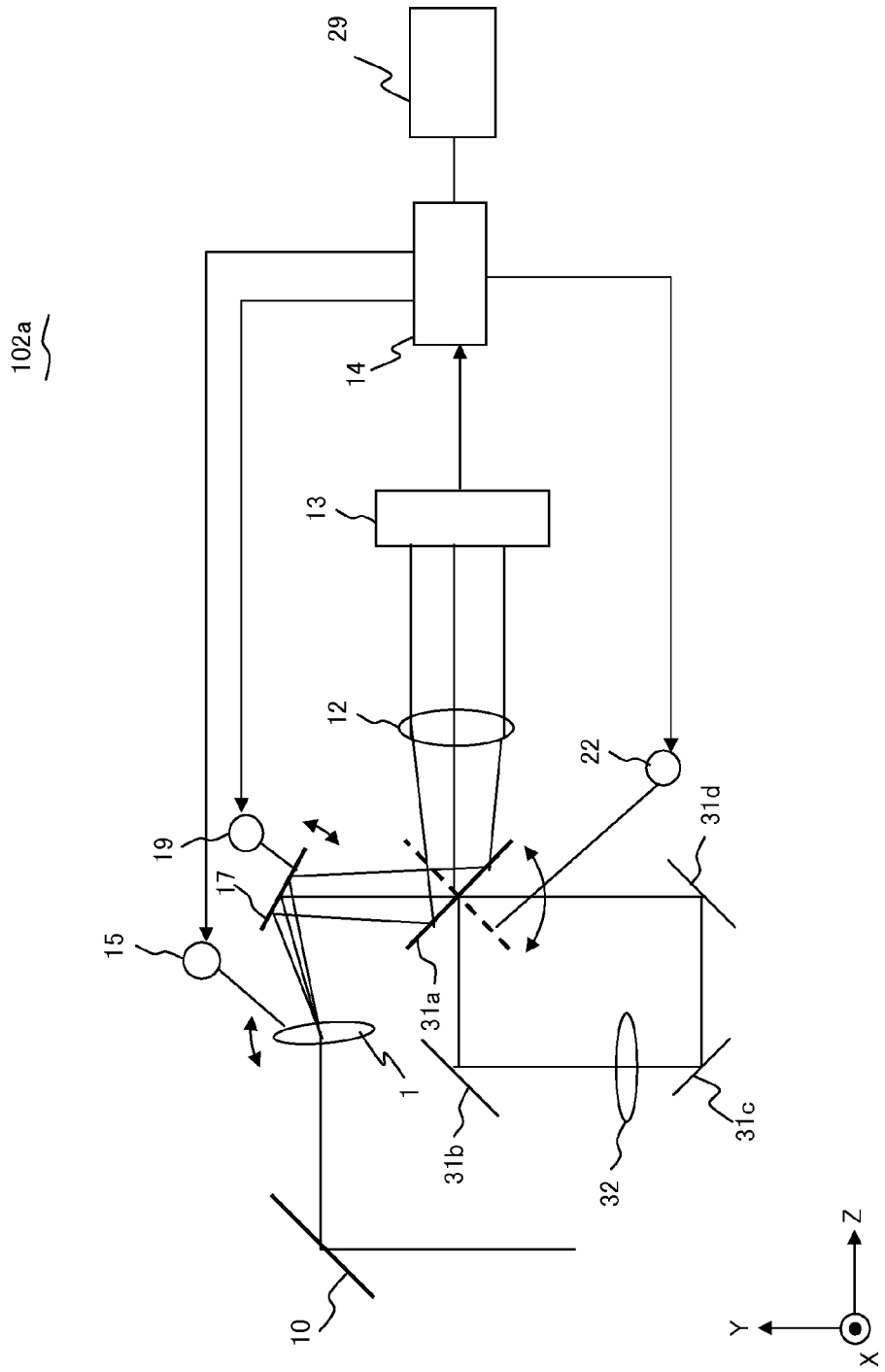
FIG. 7B is a schematic view illustrating a variation of the configuration of the confocal scanning microscope according to embodiment 3.
Figure 7C:
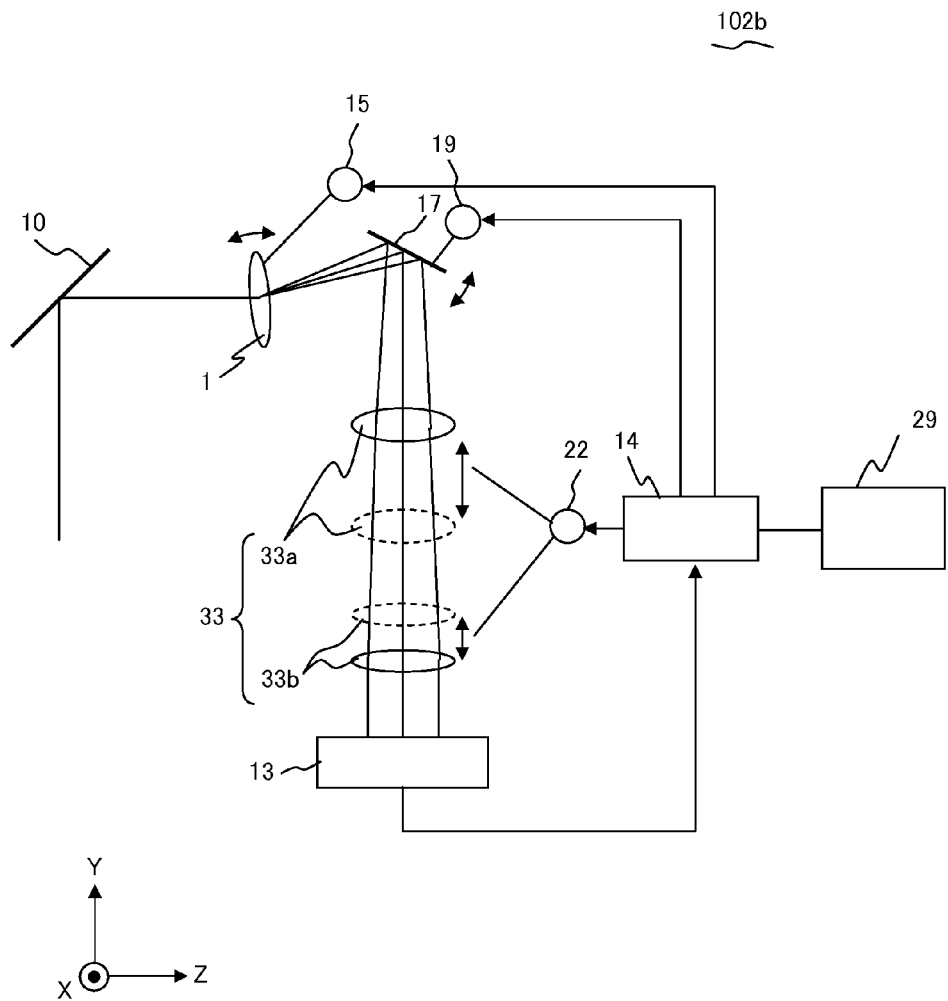
FIG. 7C is a schematic view illustrating another variation of the configuration of the confocal scanning microscope according to embodiment 3.
Figure 7D:
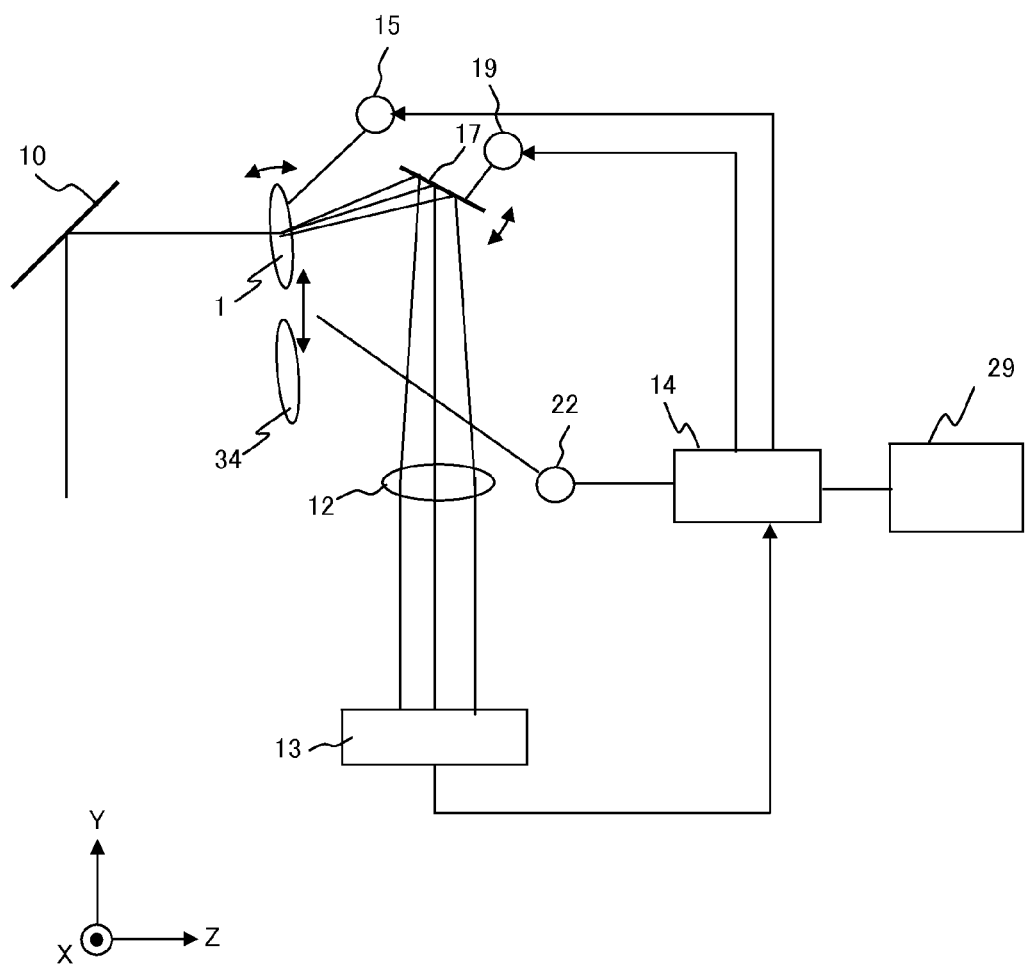
FIG. 7D is a schematic view illustrating still another variation of the configuration of the confocal scanning microscope according to embodiment 3.

FIGS. 7B, 7C and 7D are each a schematic view illustrating a variation of the configuration of the confocal scanning microscope 102 according to the present embodiment.

A confocal scanning microscope 102a illustrated in FIG. 7B includes a rotatable mirror 31a between the VPH grating 1 and the photodetector 13. Via the control unit 14 causing the drive unit 22 to rotate the mirror 31a, the confocal scanning microscope 102a can switch the condition between the wide band detection condition and the narrow band detection condition.

Specifically, when the mirror 31a is in a first condition (i.e., the condition in which the mirror 31a is indicated by the solid line), first order diffracted light reflected from the mirror 31a is focused on the photodetector 13 by the collective lens 12. As a result, the wide band detection condition is achieved.

Meanwhile, when the mirror 31a is in a second condition (i.e., the condition in which the mirror 31a is indicated by the dashed line), first order diffracted light reflected from the mirror 31a is incident on a collective lens 32 via a mirror 31b. In addition, the first order diffracted light is sent via mirrors 31c and 31d and is again incident on and reflected from the mirror 31a. Then, the first order diffracted light is focused on the photodetector 13 by the collective lens 12. In other words, when the mirror 31a is in the second condition, first order diffracted light is focused on the photodetector 13 by both the collective lenses 32 and 12. As a result, the narrow band detection condition is achieved.

A confocal scanning microscope 102b illustrated in FIG. 7C includes a collective lens group 33 located between the VPH grating 1 and the photodetector 13 and composed of a plurality of lenses (collective lenses 33a and 33b) which are capable of moving in the optical-axis direction. The collective lens group 33 is a zoom lens (a variable-magnification optical system) which achieves a plurality of zoom states each of which corresponds to a different combinational focal length that depends on the positions of the collective lenses. Via the control unit 14 causing the drive unit 22 to change the zoom state of the collective lens group 33, the confocal scanning microscope 102b can switches the condition between the wide band detection condition and the narrow band detection condition.

Specifically, when the collective lenses 33a and 33b are moved in the optical-axis direction so that a first condition is achieved in which the combinational focal length of the collective lens group 33 is short (i.e., the condition in which the collective lenses 33a and 33b are located on the positions indicated by the solid lines), then first order diffracted light is focused on the photodetector 13 by the collective lens group 33 providing the short combinational focal length. As a result, the wide band detection condition is achieved.

Meanwhile, when the collective lenses 33a and 33b are moved in the optical-axis direction so that a second condition is achieved in which the combinational focal length of the collective lens group 33 is long (i.e., the condition in which the collective lenses 33a and 33b are located on the positions indicated by the dashed lines), then first order diffracted light is focused on the photodetector 13 by the collective lens group 33 providing the long combinational focal length. As a result, the narrow band detection condition is achieved. Via the collective lenses being moved in the optical-axis direction, the confocal scanning microscope 102b can consecutively change the detection state from the wide band detection condition to the narrow band detection condition or from the narrow band detection condition to the wide band detection condition.

A confocal scanning microscope 102c illustrated in FIG. 7D includes a plurality of VPH gratings (VPH gratings 1 and 34) which can be inserted in and removed from the light path. The VPH gratings 1 and 34 each have a different grating frequency. The VPH grating 1 has a lower grating frequency than the VPH grating 34. Via the control unit 14 causing the drive unit 22 to switch the VPH grating inserted in the light path, the confocal scanning microscope 102c can switch the condition between the wide band detection condition and the narrow band detection condition.

Specifically, under a first condition in which the VPH grating 1 is inserted in the light path, first order diffracted light indicating a relatively small amount of wavelength-dispersion is focused on the photodetector 13. As a result, the wide band detection condition is achieved.

Meanwhile, under a second condition in which the VPH grating 34 is inserted in the light path, first order diffracted light indicating a relatively large amount of wavelength-dispersion is focused on the photodetector 13. As a result, the narrow band detection condition is achieved.

By changing the focal lengths of the collective lenses (group) located between the VPH grating 1 and the photodetector 13, the aforementioned confocal scanning microscopes 102, 102a and 102b change the wavelength-dispersion amount so as to change the detection condition. By contrast, by changing the grating frequency of the VPH grating, the confocal scanning microscope 102c changes the wavelength-dispersion amount so as to change the detection condition.

The confocal scanning microscopes according to the variations above (i.e., the confocal scanning microscopes 102a, 102b and 102c) can achieve an effect similar to the one achieved by the confocal scanning microscope 102 according to the present embodiment.

Embodiment 4

Figure 8:
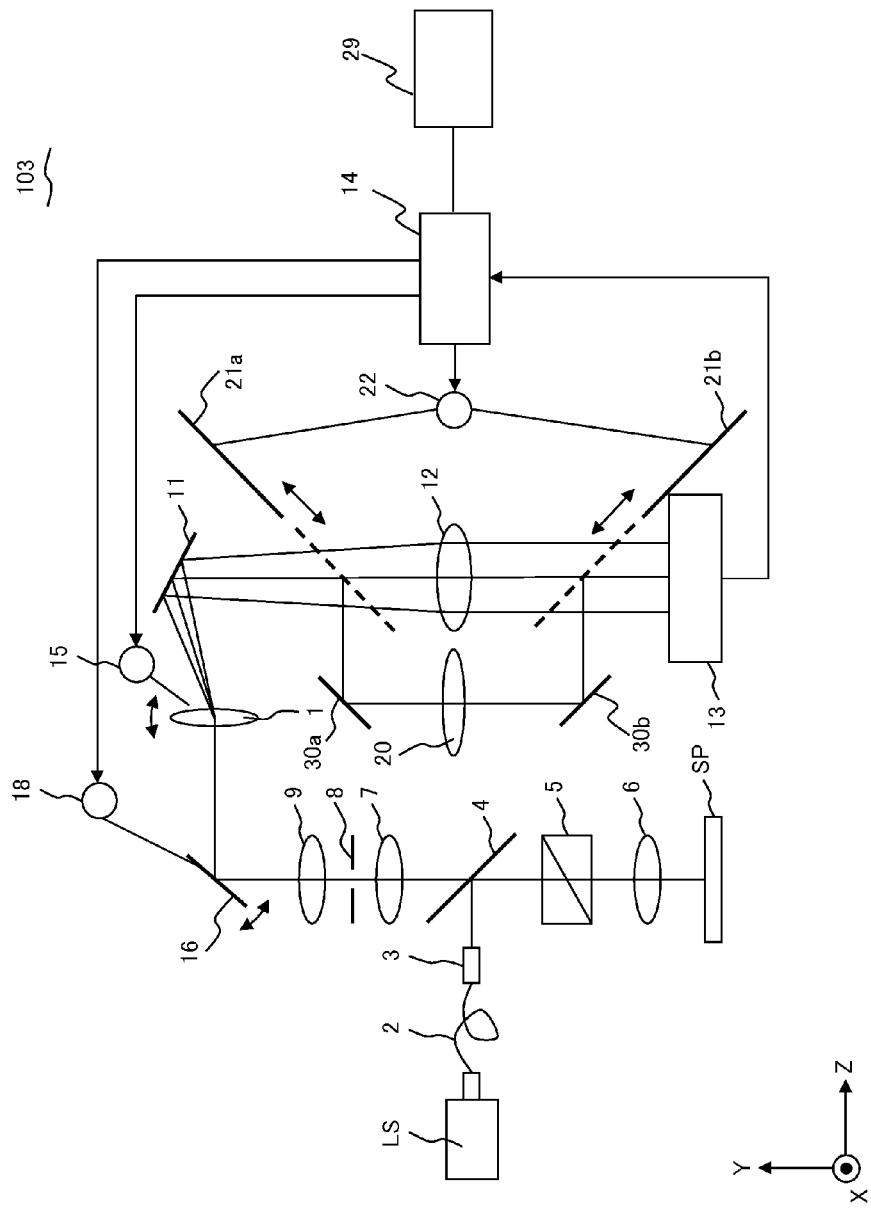
FIG. 8 is a schematic view illustrating the configuration of a confocal scanning microscope according to embodiment 4.

FIG. 8 is a schematic view illustrating the configuration of a confocal scanning microscope according to the present embodiment. An XYZ coordinate system in FIG. 8 is a left-handed orthogonal coordinate system provided for the sake of direction reference.

A confocal scanning microscope 103 illustrated in FIG. 8 is different from the confocal scanning microscope 102 according to embodiment 3 in the sense that a drive unit 18 and a mirror 16 (the first mirror), which rotates around an X axis instead of the mirror 10, are provided and that a mirror 11 is provided instead of the mirror 17 and the drive unit 19. In regard to the points other than these differences, the configuration of the confocal scanning microscope 103 according to the present embodiment is similar to that of the confocal scanning microscope 102 illustrated in FIG. 7A.

As with the confocal scanning microscope 102 according to embodiment 3, the confocal scanning microscope 103 according to the present embodiment is a confocal scanning microscope that can switch the condition between the wide band detection condition and the narrow band detection condition, and it has an incident-angle change unit, a detection-wavelength region shift unit (a detection-wavelength region maintenance unit), and a bandwidth change unit (a wavelength resolution change unit).

In the confocal scanning microscope 103, since the mirror 11 is fixed, the wavelength region of light to be detected changes only via the rotation of the mirror 16. Accordingly, the control unit 14 and the drive unit 18 together function as the detection-wavelength region shift unit. When a control is performed such that the mirror 16 is not operated, the drive unit 18 and the control unit 14 can together function as the detection-wavelength region maintenance unit which maintains the wavelength region of fluorescence to be detected by the photodetector 13.

Via the control unit 14 causing the drive unit 15 to rotate the VPH grating 1, the confocal scanning microscope 103 can change the incident angle. Accordingly, the control unit 14 and the drive unit 15 together function as the incident-angle change unit which changes the incident angle. The incident angle also changes via the rotation of the mirror 16, and hence the control unit 14 and the drive unit 15 may function as the incident-angle change unit together with the drive unit 18.

As with the case in embodiment 3, the control unit 14 and the drive unit 22 together function as the bandwidth change unit which changes the width of the wavelength region of fluorescence to be detected by the photodetector 13. The control unit 14 and the drive unit 22 also together function as the wavelength resolution change unit which changes the wavelength resolution.

As described above, the confocal scanning microscope 103 according to the present embodiment can achieve an effect similar to the one achieved by the confocal scanning microscope 102 according to embodiment 3.

The mirror 11 between the VPH grating 1 and the collective lens 12 (or the collective lens 20) may be omitted from the confocal scanning microscope 103 according to the present embodiment. The distance between the VPH grating 1 and the collective lens is limited in accordance with the focal length of the collective lens. Therefore, the configuration of the confocal scanning microscope 103 according to the present embodiment from which the mirror 11 can be omitted is desirable in the sense that its restriction on layout is small.

Embodiment 5

Figure 9:
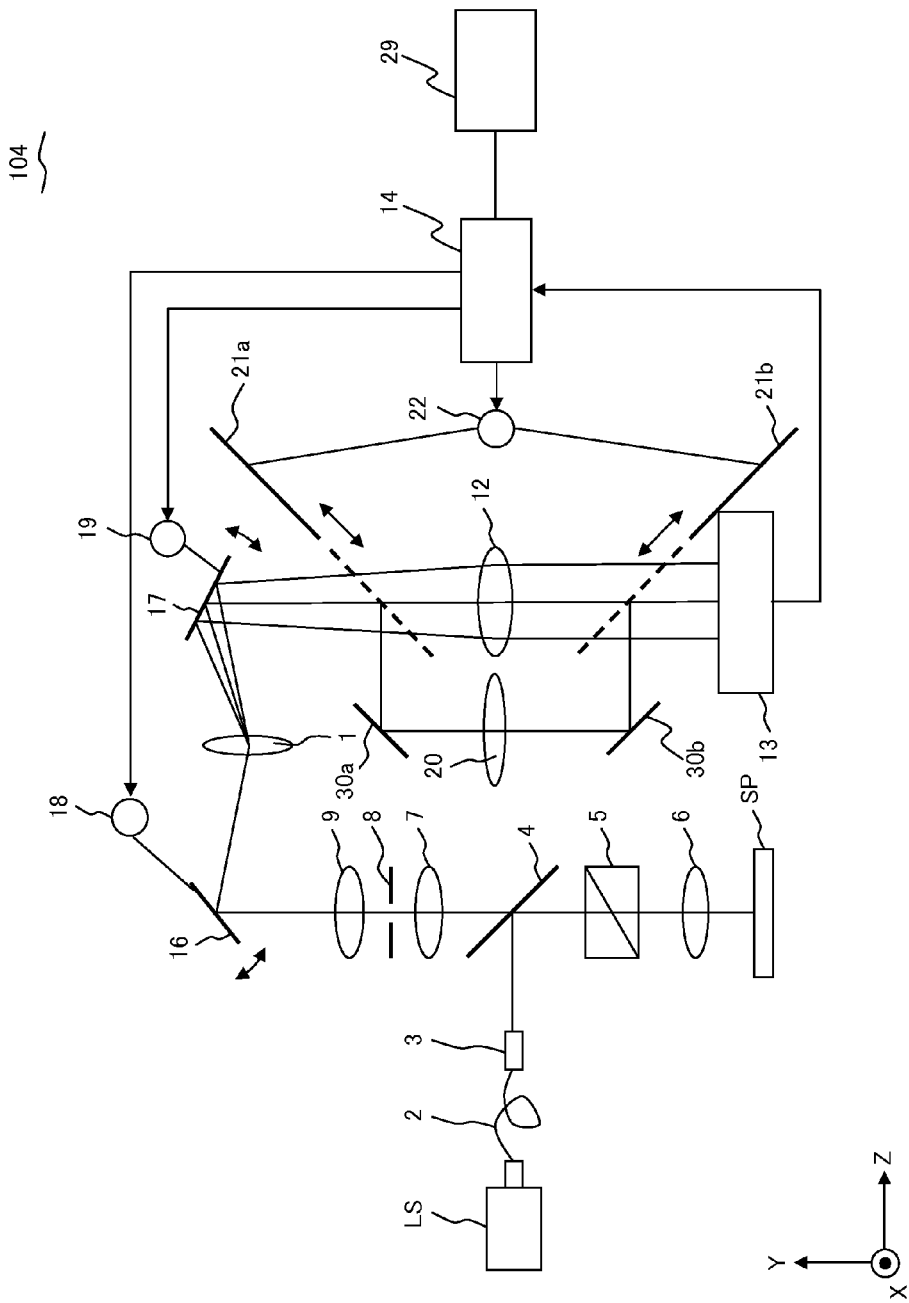
FIG. 9 is a schematic view illustrating the configuration of a confocal scanning microscope according to embodiment 5.

FIG. 9 is a schematic view illustrating the configuration of a confocal scanning microscope according to the present embodiment. An XYZ coordinate system in FIG. 9 is a left-handed orthogonal coordinate system provided for the sake of direction reference.

A confocal scanning microscope 104 illustrated in FIG. 9 is different from the confocal scanning microscope 102 according to embodiment 3 in the sense that a drive unit 18 and a mirror 16 (the first mirror), which rotates around an X axis instead of the mirror 10, are provided and that the drive unit 15 which rotates the VPH grating 1 is not provided. In regard to the points other than these differences, the configuration of the confocal scanning microscope 104 according to the present embodiment is similar to that of the confocal scanning microscope 102 illustrated in FIG. 7A.

As with the confocal scanning microscope 102 according to embodiment 3, the confocal scanning microscope 104 according to the present embodiment is a confocal scanning microscope that can switch the condition between the wide band detection condition and the narrow band detection condition, and it has an incident-angle change unit, a detection-wavelength region shift unit (a detection-wavelength region maintenance unit), and a bandwidth change unit (a wavelength resolution change unit).

Via the control unit 14 causing the drive unit 18 to rotate the mirror 16, the confocal scanning microscope 104 can change the incident angle. Accordingly, the control unit 14 and the drive unit 18 together function as the incident-angle change unit which changes the incident angle.

As with the case in embodiment 2, via the driving unit 19 rotating the mirrors 17 and 16 in the same direction by the same angle, the confocal scanning microscope 104 can focus first order diffracted light on the same position for each wavelength. Accordingly, the control unit 14 and the drive unit 19 together function as the detection-wavelength region maintenance unit. By making the rotation angle of the mirror 17 different from that of the mirror 16, the control unit 14 and the drive unit 19 also together function as the detection-wavelength region shift unit. The wavelength region of light to be detected also changes via the rotation of the mirror 16, and hence the control unit 14 and the drive unit 19 may function as the detection-wavelength region maintenance unit or the detection-wavelength region shift unit together with the drive unit 18.

As with the case in embodiment 3, the control unit 14 and the drive unit 22 together function as the bandwidth change unit which changes the width of the wavelength region of fluorescence to be detected by the photodetector 13. The control unit 14 and the drive unit 22 also together function as the wavelength resolution change unit which changes the wavelength resolution.

As described above, the confocal scanning microscope 104 according to the present embodiment can achieve an effect similar to the one achieved by the confocal scanning microscope 102 according to embodiment 3.

Embodiment 6

Figure 10:
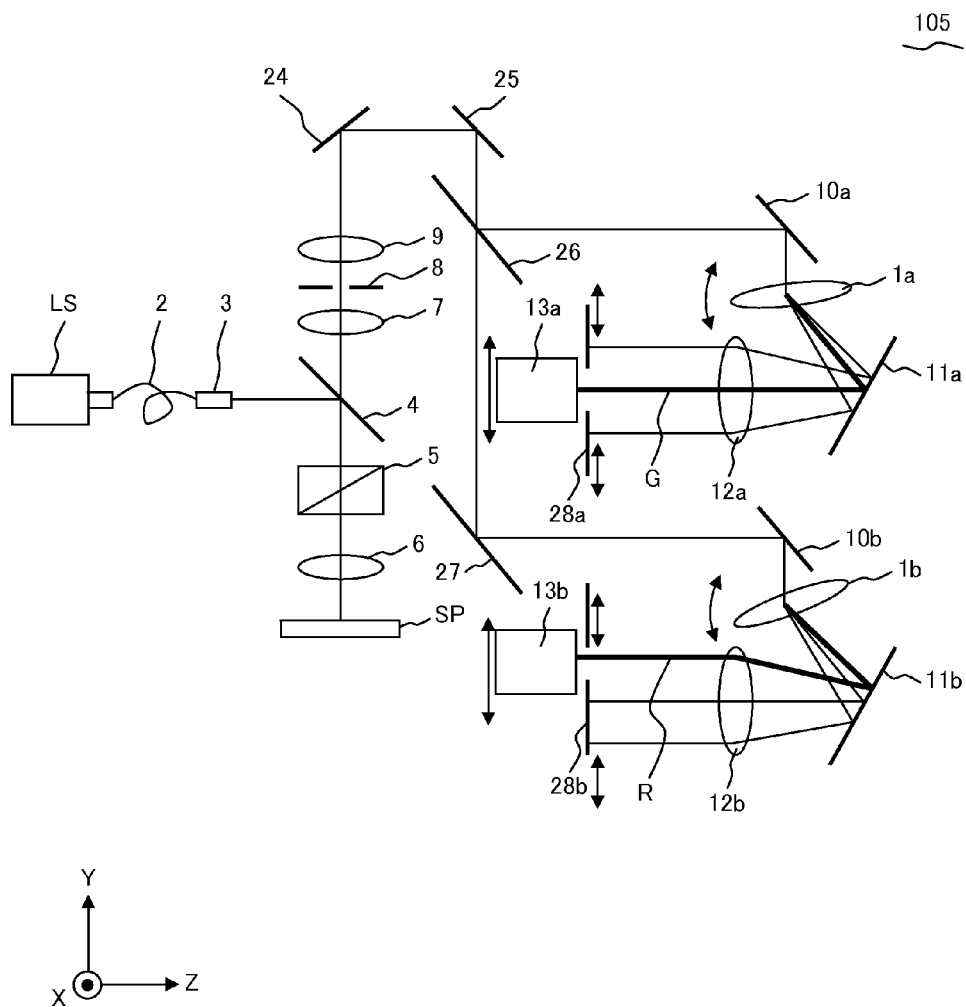
FIG. 10 is a schematic view illustrating the configuration of a confocal scanning microscope according to embodiment 6.

FIG. 10 is a schematic view illustrating the configuration of a confocal scanning microscope according to the present embodiment. An XYZ coordinate system in FIG. 10 is a left-handed orthogonal coordinate system provided for the sake of direction reference.

A confocal scanning microscope 105 according to the present embodiment illustrated in FIG. 10 is different from the confocal scanning microscope 100 according to embodiment 1 mainly in the sense that it includes a plurality of photodetectors (photodetectors 13a and 13b) which are single channel detectors instead of the photodetector 13 which is a multichannel photodetector, and that it includes stop units (step units 28a and 28b) which are located between the photodetectors and collective lenses (collective lenses 12a and 12b) and which limit the width of the wavelength region of fluorescence to be detected by the photodetectors.

As with the confocal scanning microscope 100, the confocal scanning microscope 105 includes: a laser light source LS; an optical fiber 2; a collimator lens 3; a dichroic mirror 4; a galvanometer mirror 5; an objective 6; a confocal lens 7; a confocal stop 8; and a collimator lens 9.

The confocal scanning microscope 105 further includes: a mirror 24; a mirror 25; a dichroic mirror 26 (a light-path division unit) that separates fluorescence into two pieces; a mirror 27.

The confocal scanning microscope 105 further includes: in the reflection-light path of light from the dichroic mirror 26, mirror 10a; VPH grating 1a; mirror 11a; collective lens 12a; stop unit 28a; and photodetector 13a which are single channel detector.

The confocal scanning microscope 105 further includes: in the transmitted-light path of light from the dichroic mirror 26, mirror 10b; VPH grating 1b; mirror 11b; collective lens 12b; stop unit 28b; and photodetector 13b which are single channel detector.

Each of the photo detectors (the photodetectors 13a and 13b) can be independently moved in the direction parallel to the light receiving surface of its light receiving elements (Y direction). Each of the stop units (the stop units 28a and 28b) can be independently moved in conjunction with the movement of the photodetector, thereby changing the position of the slit (opening). In addition, the widths of the slits (the openings) can be changed.

The photodetectors and the stop units are connected to a drive unit and a control unit (not shown). The control unit and the drive unit (not shown) together function as a detection-wavelength region shift unit which controls the center of the wavelength region of light to be detected by moving the photodetectors and the stop units. The control unit and the drive unit (not shown) together function as a bandwidth change unit which changes the width of the wavelength region of fluorescence to be detected by changing the slit widths of the stop units.

The VPH gratings (the VPH gratings 1a and 1b) are connected to a drive unit and a control unit (not shown). The control unit and the drive unit (not shown) together function as an incident-angle change unit which changes the incident angle by changing the tilt angle of each of the VPH gratings. The incident-angle change unit can rotate each of the VPH gratings around a rotation axis (an X axis) that is perpendicular to a plane (a YZ plane) parallel to both the optical axis and the refractive-index distribution direction.

Using an exemplary situation in which fluorescence of a wavelength corresponding to red and fluorescence of a wavelength corresponding to green are simultaneously detected by the dichroic mirror 26 which reflects fluorescence having less than 600 nm of wavelength, descriptions will be given regarding actions taken by the confocal scanning microscope 105 from the emission of laser light to the detection of fluorescence.

Laser light emitted from the laser light source LS follows a path similar to the one in the confocal scanning microscope 100, and then it irradiates the sample so that a fluorescence substance within the sample is excited. Fluorescence from the sample follows a path similar to the one in the confocal scanning microscope 100, and then it is emitted from the collimator lens 9 as an essentially parallel light flux. After this, the fluorescence is incident on the dichroic mirror 26 via the mirrors 24 and 25. The dichroic mirror 26 reflects fluorescence having less than 600 nm of wavelength and allows passage of fluorescence having 600 nm of or greater wavelength.

The fluorescence reflected from the dichroic mirror 26 is incident on the VPH grating 1a via the mirror 10a, and the VPH grating 1a diffracts the fluorescence. Here, the VPH grating 1a is rotated in advance by an incident-angle change unit (not shown) so that the wavelength corresponding to green is the Bragg wavelength, and hence fluorescence G of a wavelength corresponding to green is diffracted most efficiently. The fluorescence diffracted by the VPH grating 1a is incident on the collective lens 12a via the mirror 11a and then focused on a different position for each wavelength.

As a result, via the detection-wavelength region shift unit moving the photodetector 13a and the stop unit 28a depending on the light-focused position of the fluorescence G of a wavelength corresponding to green, the fluorescence G of a wavelength corresponding to green can be efficiently detected with the photodetector 13a. Via the bandwidth change unit making the slit width of the stop unit 28a narrower than the light receiving surface of the photodetector 13a, detection of fluorescence having wavelengths corresponding to the colors other than green can be suppressed. Accordingly, noise components are suppressed, thereby improving the S/N.

Meanwhile, the fluorescence passing through the dichroic mirror 26 is incident on the VPH grating 1b via the mirror 10b, and the VPH grating 1b diffracts the fluorescence. Here, the VPH grating 1b is rotated in advance by an incident-angle change unit (not shown) so that the wavelength corresponding to red is the Bragg wavelength, and hence fluorescence R of a wavelength corresponding to red is diffracted most efficiently. The fluorescence diffracted by the VPH grating 1b is incident on the collective lens 12b via the mirror 11b and then focused on a different position for each wavelength.

As a result, via the detection-wavelength region shift unit moving the photodetector 13b and the stop unit 28b depending on the light-focused position of the fluorescence R of a wavelength corresponding to red, the fluorescence R of a wavelength corresponding to red can be efficiently detected with the photodetector 13b. Via the bandwidth change unit making the slit width of the stop unit 28b narrower than the light receiving surface of the photodetector 13b, detection of pieces of fluorescence having wavelengths corresponding to the colors other than red can be suppressed. Accordingly, noise components are suppressed, thereby improving the S/N.

As with the confocal scanning microscope 100 according to embodiment 1, the confocal scanning microscope 105 according to the present embodiment can readily change the Bragg wavelength by rotating the VPH grating to change the incident angle. Accordingly, by changing the Bragg wavelength depending on the wavelength of fluorescence to be detected, the confocal scanning microscope 105 can achieve high light-use efficiency.

Using the combination of a photodetector of single channel type and a stop unit, the confocal scanning microscope 105 according to the present embodiment can efficiently detect fluorescence to be detected while suppressing noise. Accordingly, in comparison with a confocal scanning microscope employing a photodetector of multichannel type, a higher S/N can be achieved.

The confocal scanning microscope 105 has a VPH grating for each wavelength of light to be detected. Accordingly, when pieces of fluorescence each having a different wavelength are simultaneously detected, the VPH gratings can be optimized for the wavelengths. As a result, the confocal scanning microscope 105 can simultaneously achieve high diffraction efficiency for a plurality of wavelengths of fluorescence. The configuration in which a VPH grating is provided for each wavelength of light to be detected is especially effective when, for example, the wavelengths of pieces of light to be detected are separated greatly from each other.

In the confocal scanning microscope 105, the wavelength region of fluorescence to be incident on each VPH grating is limited by the dichroic mirror 26. Accordingly, the VPH gratings may be designed so that they each achieve high diffraction efficiency for the limited wavelength region. As described above, VPH gratings have a tradeoff between the maximum diffraction efficiency and a bandwidth in which diffracted light can be obtained, and hence higher maximum diffraction efficiency can be obtained by limiting the wavelength region. Therefore, in comparison with a confocal scanning microscope including only a single VPH grating, the confocal scanning microscope 105 can detect fluorescence to be detected more efficiently.

For simplicity, FIG. 10 illustrates a configuration in which two pieces of light of different wavelengths are simultaneously detected; however, the configuration is not particularly limited to this. If detecting only light of a single wavelength is enough, a mirror may be used instead of the dichroic mirror 26. When it is necessary to simultaneously detect three or more pieces of light of different wavelengths, a dichroic mirror (i.e., a light-path division unit) may be used instead of the mirror 27 so as to add a photodetector. The photodetector to be added is not limited to a detector of single channel type. It may be a detector of multichannel type.

Embodiment 7

FIG. 11 is a schematic view illustrating the configuration of a confocal scanning microscope according to the present embodiment. An XYZ coordinate system in FIG. 11 is a left-handed orthogonal coordinate system provided for the sake of direction reference.

A confocal scanning microscope 106 according to the present embodiment illustrated in FIG. 11 is different from the confocal scanning microscope 105 according to embodiment 6 in the sense that mirrors 17a and 17b which rotate around X axes are provided instead of the mirrors 11a and 11b, and that photodetectors (photodetectors 13a and 13b) are fixed. In regard to the points other than these differences, the configuration of the confocal scanning microscope 106 according to the present embodiment is similar to that of the confocal scanning microscope 105 illustrated in FIG. 10. Accordingly, only portions of the configuration of the confocal scanning microscope 106 are shown in FIG. 11.

As with the confocal scanning microscope 105 according to embodiment 6, the confocal scanning microscope 106 according to the present embodiment has an incident-angle change unit, a detection-wavelength region shift unit, and a bandwidth change unit.

As with the confocal scanning microscope 105 according to embodiment 6, in the confocal scanning microscope 106, a control unit and a drive unit (not shown) which change the tilt angles of the VPH gratings 1a and 1b together function as the incident-angle change unit, and a control unit and a drive unit (not shown) which change the slit width of the stop unit together function as the bandwidth change unit.

In the confocal scanning microscope 106, via a control unit (not shown) causing a drive unit (not shown) to rotate the mirrors 17a and 17b, wavelength region of fluorescence to be incident on the photodetectors can be changed. Accordingly, the control unit (not shown) and the drive unit (not shown) which rotate the mirrors 17a and 17b together function as a detection-wavelength region shift unit.

As described above, the confocal scanning microscope 106 according to the present embodiment can achieve an effect similar to the one achieved by the confocal scanning microscope 105 according to embodiment 6. In addition, in the confocal scanning microscope 106, the wavelength region of light to be detected is changed by rotating the mirrors not the photodetectors, and hence the confocal scanning microscope 106 can change the wavelength region of light to be detected faster than the confocal scanning microscope 105.

Embodiment 8

FIG. 12 is a schematic view illustrating the configuration of a confocal scanning microscope according to the present embodiment. An XYZ coordinate system in FIG. 12 is a left-handed orthogonal coordinate system provided for the sake of direction reference.

A confocal scanning microscope 107 according to the present embodiment illustrated in FIG. 12 is different from the confocal scanning microscope 105 according to embodiment 6 in the sense that mirrors 16a and 16b (first mirrors) which rotate around X axes are provided instead of the mirrors 10a and 10b, and that photodetectors (photodetectors 13a and 13b) are fixed. In regard to the points other than these differences, the configuration of the confocal scanning microscope 107 according to the present embodiment is similar to that of the confocal scanning microscope 105 illustrated in FIG. 10. Accordingly, only portions of the configuration of the confocal scanning microscope 107 are shown in FIG. 12.

As with the confocal scanning microscope 105 according to embodiment 6, the confocal scanning microscope 107 according to the present embodiment has an incident-angle change unit, a detection-wavelength region shift unit, and a bandwidth change unit.

As with the confocal scanning microscope 105 according to embodiment 6, in the confocal scanning microscope 107, a control unit and a drive unit (not shown) which change the slit width of the stop unit together function as the bandwidth change unit.

In the confocal scanning microscope 107, since the mirrors 11a and 11b are fixed, the wavelength region of light to be detected changes only via the rotation of the mirrors 16a and 16b. Accordingly, the control unit (not shown) and the drive unit (not shown) which rotate the mirrors 16a and 16b together function as a detection-wavelength region shift unit.

Via a control unit (not shown) causing a drive unit (not shown) to rotate the VPH gratings 1a and 1b, the confocal scanning microscope 107 can change the incident angle. Accordingly, the control unit (not shown) and the drive unit (not shown) which rotate the VPH gratings 1a and 1b together function as an incident-angle change unit. The incident angle also changes via the rotation of the mirrors 16a and 16b, and hence the control unit (not shown) and the drive unit (not shown) may function as the incident-angle change unit together with the drive unit for the mirrors 16a and 16b.

As described above, the confocal scanning microscope 107 according to the present embodiment can achieve an effect similar to the one achieved by the confocal scanning microscope 105 according to embodiment 6. In addition, in the confocal scanning microscope 107, the wavelength region of light to be detected is changed by rotating the mirrors and the VPH gratings not the photodetectors, and hence the confocal scanning microscope 107 can change the wavelength region of light to be detected faster than the confocal scanning microscope 105.

Embodiment 9

Figure 13:
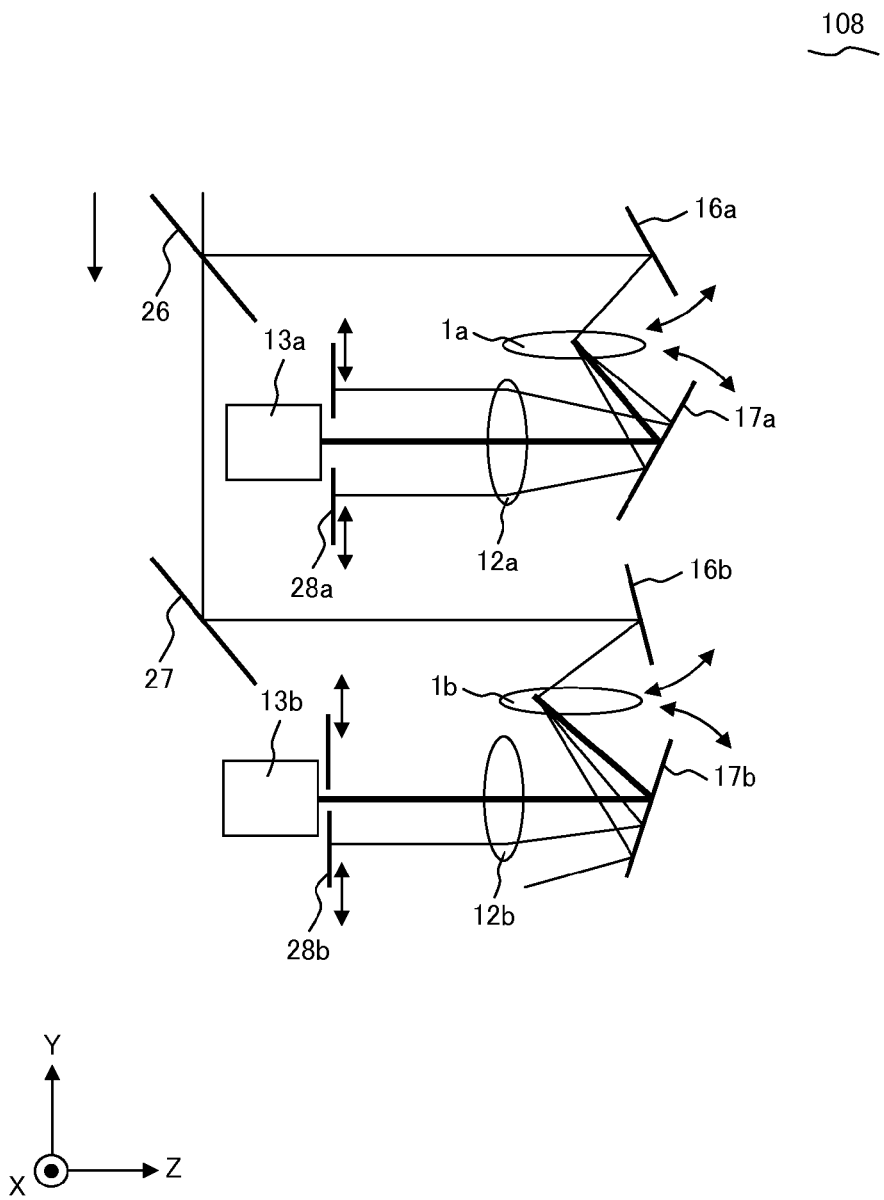
FIG. 13 is a schematic view illustrating the configuration of a confocal scanning microscope according to embodiment 9.

FIG. 13 is a schematic view illustrating the configuration of a confocal scanning microscope according to the present embodiment. An XYZ coordinate system in FIG. 13 is a left-handed orthogonal coordinate system provided for the sake of direction reference.

A confocal scanning microscope 108 according to the present embodiment illustrated in FIG. 13 is different from the confocal scanning microscope 105 according to embodiment 6 in the sense that mirrors 16a and 16b (first mirrors) which rotate around X axes are provided instead of the mirrors 10a and 10b, that mirrors 17a and 17b (second mirrors) which rotate around x axes are provided instead of the mirrors 11a and 11b, and that VPH gratings (VPH gratings 1a and 1b) and photodetectors (photodetectors 13a and 13b) are fixed. In regard to the points other than these differences, the configuration of the confocal scanning microscope 108 according to the present embodiment is similar to that of the confocal scanning microscope 105 illustrated in FIG. 10. Accordingly, only portions of the configuration of the confocal scanning microscope 108 are shown in FIG. 13.

As with the confocal scanning microscope 105 according to embodiment 6, the confocal scanning microscope 108 according to the present embodiment has an incident-angle change unit, a detection-wavelength region shift unit, and a bandwidth change unit.

As with the confocal scanning microscope 105 according to embodiment 6, in the confocal scanning microscope 108, a control unit and a drive unit (not shown) which change the slit width of the stop unit together function as the bandwidth change unit.

Via a control unit (not shown) causing a drive unit (not shown) to rotate the mirrors 16a and 16b, the confocal scanning microscope 108 can change the incident angle. Accordingly, the control unit (not shown) and the drive unit (not shown) which rotate the mirrors 16a and 16b together function as an incident-angle change unit.

In the confocal scanning microscope 108, the wavelength region of light to be detected changes via a drive unit (not shown) rotating the mirrors 17a and 17b. Accordingly, the control unit (not shown) and the drive unit (not shown) which rotate the mirrors 17a and 17b together function as a detection-wavelength region shift unit. The wavelength region of light to be detected also changes via the rotation of the mirrors 16a and 16b, and hence the control unit (not shown) and the drive unit (not shown) may function as the detection-wavelength region shift unit together with the drive unit for the mirrors 16a and 16b.

As described above, the confocal scanning microscope 108 according to the present embodiment can achieve an effect similar to the one achieved by the confocal scanning microscope 105 according to embodiment 6. In addition, in the confocal scanning microscope 108, the wavelength region of light to be detected is changed by rotating the mirrors not the photodetectors, and hence the confocal scanning microscope 108 can change the wavelength region of light to be detected faster than the confocal scanning microscope 105.

Each of embodiment 1 to embodiment 9 shows an example of use of a confocal scanning microscope, but this invention is not particularly limited to use of a confocal scanning microscope. This invention is applicable to any kind of microscope.

What is claimed is:

1. A scanning microscope provided with a scan unit that scans a sample, the scanning microscope comprising:
   a transmissive volume phase holographic (VPH) grating for dispersing light from the sample;
   a driving unit of the VPH grating for changing an angle formed by an optical axis of light incident on the VPH grating and a refractive-index distribution direction in which a refractive index of the VPH grating cyclically changes, by rotating the VPH grating around a rotation axis that is perpendicular to a plane parallel to the optical axis and the refractive-index distribution direction;
   a photodetector for detecting the light diffracted by the VPH grating; and
   a control unit for controlling the driving unit of the VPH grating when a Bragg wavelength is to be changed.

2. The scanning microscope according to claim 1, further comprising a collective optical system located between the VPH grating and the photodetector, the collective optical system focusing the light onto the photodetector, wherein the photodetector is a multichannel detector on which a plurality of light receiving elements are one-dimensionally arranged.

3. The scanning microscope according to claim 1, further comprising:
   a mirror located between the scan unit and the VPH grating; and
   a driving unit of the mirror for rotating the mirror around a rotation axis that is perpendicular to the plane parallel to the optical axis and the refractive-index distribution direction, and for changing a center of a wavelength region of the light to be detected by the photodetector,
   wherein the control unit further controls the driving unit of the mirror, and controls the driving unit of the mirror independently from the driving unit of the VPH grating when a detection-wavelength region is to be changed.

4. The scanning microscope according to claim 2, further comprising:
   a mirror located between the VPH grating and the collective optical system; and
   a driving unit of the mirror for rotating the mirror around a rotation axis that is perpendicular to the plane parallel to the optical axis and the refractive-index distribution direction, and for changing a center of a wavelength region of the light to be detected by the photodetector,
   wherein the control unit further controls the driving unit of the mirror, and controls the driving unit of the mirror independently from the driving unit of the VPH grating when a detection-wavelength region is to be changed.

5. The scanning microscope according to claim 2, further comprising a bandwidth change unit for changing a width of a wavelength region of the light to be detected by the photodetector.

6. The scanning microscope according to claim 5, wherein:
   a plurality of the collective optical systems are provided between the VPH grating and the photodetector, the plurality of the collective optical systems being selectively used and each having a different focal length; and the bandwidth change unit switches between the collective optical systems for a collective optical system on which the light is to be incident.

7. The scanning microscope according to claim 5, wherein:
the collective optical system is a variable-magnification optical system including a plurality of optical elements and having a variable combinational focal length; and
the bandwidth change unit changes the combinational focal length of the variable-magnification optical system.

8. The scanning microscope according to claim 5, wherein:
a plurality of the VPH gratings are provided, the plurality of the VPH gratings being transmissive gratings which disperse light from the sample and each of which has a different grating frequency; and
the bandwidth change unit selectively places one of the plurality of VPH gratings within the path of detected light.

9. The scanning microscope according to claim 1, further comprising:
a collective optical system located between the VPH grating and the photodetector, the collective optical system focusing the light onto the photodetector; and
a stop unit located between the photodetector and the collective optical system, the stop unit limiting a width of a wavelength region of the light to be detected by the photodetector,
wherein a width of an opening of the stop unit is variable, and the photodetector is a single channel detector including a single light receiving element.

10. The scanning microscope according to claim 9, further comprising:
a detection-wavelength region shift unit for controlling a center of a wavelength region of the light to be detected by the photodetector,
wherein the detection-wavelength region shift unit moves the photodetector and the stop unit in a direction parallel to a light receiving surface of the photodetector.

11. A scanning microscope provided with a scan unit that scans a sample, the scanning microscope comprising:
a transmissive volume phase holographic (VPH) grating for dispersing light from the sample;
a first mirror located between the scan unit and the VPH grating;
a driving unit of the first mirror for changing an angle formed by an optical axis of the light incident on the VPH grating and a refractive-index distribution direction in which a refractive index of the VPH grating cyclically changes, by rotating the first mirror around a rotation axis that is perpendicular to a plane parallel to the optical axis and the refractive-index distribution direction;
a photodetector for detecting the light diffracted by the VPH grating;
a second mirror located between the VPH grating and the photodetector;
a driving unit of the second mirror for rotating the second mirror around a rotation axis that is perpendicular to the plane parallel to the optical axis and the refractive-index distribution direction; and
a control unit for controlling the driving unit of the first mirror and the driving unit of the second mirror such that the first mirror and the second mirror are rotated in a same direction by a same rotation angle when a Bragg wavelength is to be changed.

12. The scanning microscope according to claim 11, wherein the control unit controls the driving unit of the first mirror independently from the driving unit of the second mirror such that the first mirror and the second mirror have different rotation angles when a detection-wavelength region is to be changed.

13. The scanning microscope according to claim 11, further comprising a collective optical system located between the VPH grating and the photodetector, the collective optical system focusing the light onto the photodetector,
wherein the photodetector is a multichannel detector on which a plurality of light receiving elements are one-dimensionally arranged.

* * * * *